(12) United States Patent
Yang et al.

(10) Patent No.: US 8,949,013 B2
(45) Date of Patent: Feb. 3, 2015

(54) RANKING NEARBY DESTINATIONS BASED ON VISIT LIKELIHOODS AND PREDICTING FUTURE VISITS TO PLACES FROM LOCATION HISTORY

(71) Applicant: Google Inc., Mountain View, CA (US)

(72) Inventors: Guang Yang, San Jose, CA (US); Tushar Udeshi, Broomfield, CO (US); Andrew Kirmse, Redwood City, CA (US); Emil Praun, Union City, CA (US); Pablo Bellver, Mountain View, CA (US); Keir Banks Mierle, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/955,874

(22) Filed: Jul. 31, 2013

(65) Prior Publication Data

US 2013/0345957 A1 Dec. 26, 2013

Related U.S. Application Data

(63) Continuation of application No. PCT/US2013/047186, filed on Jun. 21, 2013.

(60) Provisional application No. 61/662,964, filed on Jun. 22, 2012, provisional application No. 61/663,058, filed on Jun. 22, 2012, provisional application No. 61/663,773, filed on Jun. 25, 2012, provisional application No. 61/663,798, filed on Jun. 25, 2012.

(51) Int. Cl.
*G06N 5/02* (2006.01)
*G06F 17/30* (2006.01)

(52) U.S. Cl.
CPC ............ *G06N 5/02* (2013.01); *G06F 17/30241* (2013.01); *G06F 17/3053* (2013.01)
USPC .................. 701/300; 706/46; 706/52; 706/56

(58) Field of Classification Search
CPC .. G06N 5/02; G06F 17/3053; G06F 17/30241
USPC ......................................................... 701/300
See application file for complete search history.

(56) References Cited

U.S. PATENT DOCUMENTS 7,720,652 B2 * 5/2010 Toyama et al. ................... 703/2
7,739,040 B2 * 6/2010 Horvitz .......................... 701/414

(Continued)

OTHER PUBLICATIONS

Burbey, Ingrid E., "Predicting Future Locations and Arrival Times of Individuals," PhD Dissertation, VPI, Blacksburg, VA, Apr. 26, 2011, url: http://scholar.lib.vt.edu/theses/available/etd-05052011-130912/unrestricted/Burbey_IE_D_2011_2.pdf.*

(Continued)

*Primary Examiner* — Fadey Jabr
*Assistant Examiner* — Allen E Quillen
(74) *Attorney, Agent, or Firm* — Shumaker & Sieffert, P.A.

(57) ABSTRACT

In some examples, systems and techniques can determine a respective visit likelihood for each respective destination of a plurality of destinations based at least in part on a respective distance between the respective destination and a geographic location from a location history associated with a user and a comparison between a time associated with the geographic location and a visit likelihood distribution across time. The systems and techniques can then sort at least some of the plurality of destinations. In other examples, systems and techniques can determine whether a user is likely to visit a place during a future instance of a timeslot based at least in part on a location history associated with the user. The systems and techniques can then output information relating to the place prior to the beginning of the future instance of the timeslot.

13 Claims, 8 Drawing Sheets

(56) References Cited

U.S. PATENT DOCUMENTS

| | | | |
|---|---|---|---|
| 8,290,132 B2* | 10/2012 | Klemm | 379/142.1 |
| 8,321,527 B2* | 11/2012 | Martin et al. | 709/217 |
| 8,473,197 B2* | 6/2013 | Horvitz | 701/423 |
| 8,645,061 B2* | 2/2014 | Newson et al. | 701/469 |
| 8,650,139 B2* | 2/2014 | Jain et al. | 706/12 |
| 2008/0027639 A1* | 1/2008 | Tryon | 701/209 |
| 2009/0125321 A1* | 5/2009 | Charlebois et al. | 705/1 |
| 2010/0070334 A1* | 3/2010 | Monteverde | 705/10 |
| 2011/0319094 A1* | 12/2011 | Usui et al. | 455/456.1 |
| 2012/0161986 A1* | 6/2012 | Amir | 340/932.2 |
| 2012/0226523 A1* | 9/2012 | Weiss et al. | 705/7.34 |
| 2012/0289147 A1* | 11/2012 | Raleigh et al. | 455/3.06 |
| 2012/0310534 A1* | 12/2012 | Mizuno et al. | 701/540 |

OTHER PUBLICATIONS

Persad-Maharaj et al "Real-Time Travel Path Prediction using GPS-Enabled Mobile Phones," University of South Florida Center for Urban Transportation Research, Aug. 27, 2008, url: http://citeseerx.ist.psu.edu/viewdoc/download?doi=10.1.1.149.8272&rep=rep1&type=pdf.*

* cited by examiner

310

```
gcid:food
2,1,1,1,1,1,1,1,1,4,4,6,8,8,6,4,4,6,8,8,6,4,4,2
2,1,1,1,1,1,1,1,1,4,4,6,8,8,6,4,4,6,8,8,6,4,4,2
2,1,1,1,1,1,1,1,1,4,4,6,8,8,6,4,4,6,8,8,6,4,4,2
2,1,1,1,1,1,1,1,1,4,4,6,8,8,6,4,4,6,8,8,6,4,4,2
2,1,1,1,1,1,1,1,1,4,4,6,8,8,6,4,4,6,8,8,6,4,4,2
2,1,1,1,1,1,1,1,1,4,4,6,8,8,6,4,4,6,8,8,6,4,4,2
2,1,1,1,1,1,1,1,1,4,4,6,8,8,6,4,4,6,8,8,6,4,4,2
```

```
gcid:accommodation
8,8,8,8,8,8,8,8,6,4,3,3,3,3,3,3,3,3,3,4,6,8,8,8
8,8,8,8,8,8,8,8,6,4,3,3,3,3,3,3,3,3,3,4,6,8,8,8
8,8,8,8,8,8,8,8,6,4,3,3,3,3,3,3,3,3,3,4,6,8,8,8
8,8,8,8,8,8,8,8,6,4,3,3,3,3,3,3,3,3,3,4,6,8,8,8
8,8,8,8,8,8,8,8,6,4,3,3,3,3,3,3,3,3,3,4,6,8,8,8
8,8,8,8,8,8,8,8,6,4,3,3,3,3,3,3,3,3,3,4,6,8,8,8
8,8,8,8,8,8,8,8,6,4,3,3,3,3,3,3,3,3,3,4,6,8,8,8
```

```
gcid:administrative_area
1,1,1,1,1,1,1,1,3,3,3,3,3,3,3,3,3,3,1,1,1,1,1,1
1,1,1,1,1,1,1,1,3,3,3,3,3,3,3,3,3,3,1,1,1,1,1,1
1,1,1,1,1,1,1,1,3,3,3,3,3,3,3,3,3,3,1,1,1,1,1,1
1,1,1,1,1,1,1,1,3,3,3,3,3,3,3,3,3,3,1,1,1,1,1,1
1,1,1,1,1,1,1,1,3,3,3,3,3,3,3,3,3,3,1,1,1,1,1,1
1,1,1,1,1,1,1,1,3,3,3,3,3,3,3,3,3,3,1,1,1,1,1,1
1,1,1,1,1,1,1,1,3,3,3,3,3,3,3,3,3,3,1,1,1,1,1,1
```

FIG. 3C

RANKING NEARBY DESTINATIONS BASED ON VISIT LIKELIHOODS AND PREDICTING FUTURE VISITS TO PLACES FROM LOCATION HISTORY

This application is a Continuation of Application Serial No. PCT/US2013/047186, filed on Jun. 21, 2013, which claims the benefit of U.S. Provisional Patent Application No. 61/662,964, filed on Jun. 22, 2012, U.S. Provisional Patent Application No. 61/663,058, filed Jun. 22, 2013, U.S. Provisional Patent Application No. 61/663,773, filed on Jun. 25, 2012, and U.S. Provisional Patent Application No. 61/663,798, filed on Jun. 25, 2012, the entire contents of which are incorporated herein by reference.

BACKGROUND

Mobile devices such as smartphones and tablets have opened up a variety of new services that can be provided to users on the go. The geographic location of a mobile device can be determined using any of several technologies for determining its position, including by referencing cellular network towers, WiFi locations, or GPS. Where users opt in to allowing services to use their geographic location, location-based services can be provided through the local device.

A location-based service is an information or entertainment service, which is accessible on mobile devices through a mobile network and which uses information on the geographical position of the mobile device. First generation location-based services can include services to identify a location of a person or object, such as discovering the nearest banking cash machine or the whereabouts of a friend. Such services can also include mobile commerce, for example, by providing coupons or advertising directed at customers based on their current location. They could further include personalized weather services and even location-based games.

A more-granular understanding of a user's location information, (e.g., personalized and history aware location information), can allow more sophisticated services to be provided. For example, when a user runs errands, the user's mobile device can generate a location history including data points such as longitude, latitude, and a timestamp for each visited location. More valuable, however, would be a list of businesses or other destinations visited by the user. Having such information might allow users to "check in" using social applications more easily by presenting the user with the name of the business that they are visiting when they choose to check in. E-commerce applications might include delivery coupons or advertising relating to businesses that the user actually visits. The mobile device could have an application that provides the user with a journal of where the user has gone on a given day or days. Many other improved location-based services could be provided with such information.

In general, determining where the user visited can be accomplished using local search engines. Local search engines are search engines that allow users to submit geographically constrained searches against a structured database of local business listings. Results are not always accurate, however. Location information derived from mobile devices is not always exact. GPS can provide good results, but not indoors (including in places such as malls) or in other places where GPS signals can be difficult to receive, such as in "urban canyons." Businesses may also be very closely clustered, including where single buildings include many businesses or where one business may be above or below another. Businesses may also not be geographically separated—one example is a hotel that also has a restaurant; it would be useful to know whether a visitor dined or stayed in such a place. Still further, the local search databases may not have fully precise information for distinguishing the coordinates of nearby businesses. All of these things contribute to local search engines providing inaccurate results under these circumstances.

SUMMARY

In one example, the disclosure describes a method including determining, by a computing system, information associated with a plurality of destinations proximate to a geographic location from a location history associated with a user, the geographic location being associated with a time, the information associated with the plurality of destinations including, for each respective destination of the plurality of destinations, at least a name of the respective destination and a respective distance between the respective destination and the geographic location. The method also can include, for each respective destination of the plurality of destinations, determining, by the computing system, based at least in part on 1) the respective distance between the respective destination and the geographic location and 2) a comparison between the time associated with the geographic location and a visit likelihood distribution across time, a visit likelihood associated with the respective destination. Additionally, the method can include sorting, by the computing system and based at least in part on the visit likelihood associated with the respective destination, a portion of the plurality of destinations; and outputting, by the computing system, an indication of the portion of the plurality of destinations.

In another example, the disclosure describes a computer-readable storage device storing instructions that, when executed, cause at least one processor of a computing device to determine, based at least in part on a plurality of proximate geographical location data points from a location history associated with a user, a geographic location for a visit having a visit start time and a visit end time. The computer-readable storage device can also store instructions that, when executed, cause the at least one processor of the computing device to determine information associated with a plurality of destinations proximate to the geographic location, the information associated with the plurality of destinations including, for each respective destination of the plurality of destinations, at least a name of the destination and a respective distance between the respective destination and the geographic location. Further, the computer-readable storage device can store instructions that, when executed, cause the at least one processor of the computing device to, for each respective destination of the plurality of destinations, determine, based at least in part on 1) the respective distance between the respective destination and the geographic location, 2) a comparison between the visit start time and a visit likelihood distribution across time, and 3) a comparison between the visit end time and the visit likelihood distribution across time, a respective visit likelihood for the respective destination. Additionally, the computer-readable storage device can store instructions that, when executed, cause the at least one processor of the computing device to sort, based at least in part on the respective visit likelihood associated with the respective destination, a portion of the plurality of destinations; and output an indication of the portion of the plurality of destinations.

In a further example, the disclosure describes a method that includes receiving, by a computing device, a location history associated with a user, and determining, by the computing device, based at least in part on the location history, a place that the user previously visited and visit history data indicating whether the user visited the place during any of a plurality of past instances of a timeslot. The method also can include determining, by the computing device and based at least in part on the visit history data, that the user is likely to visit the place during a future instance of the timeslot. Further, the method can include, responsive to determining that the user is likely to visit the place during the future instance of the timeslot, outputting, by the computing device, information relating to the place prior to the beginning of the future instance of the timeslot.

In an additional example, the disclosure describes a computer-readable storage device storing instructions that, when executed, cause at least one processor of a computing device to receive a location history associated with a user, and determine, based at least in part on the location history, a visit vector comprising a plurality of vector elements, each respective vector element corresponding to a respective past instance of a timeslot and having a value indicating that the user visited a place during the respective past instance of the timeslot or a value indicating that the user did not visit the place during the respective past instance of the timeslot. The computer-readable storage device can also store instructions that, when executed, cause the at least one processor of the computing device to execute a function $T(X,Y)$ that receives as inputs the visit vector, a value of Y, and a value of X, wherein Y is a length of a sub-stream of interest measured in the number of elements in the sub-stream, wherein X is the number of positive elements in the sub-stream of interest, and wherein the function $T(X,Y)$ returns the number of sub-streams in the visit vector having the length of Y, having exactly X positive elements, and being followed by a subsequent element in the visit vector. Further, the computer-readable storage device can store instructions that, when executed, cause the at least one processor of the computing device to determine, based at least in part on the number returned by the function $T(X,Y)$, that the user is likely to visit the place during a future instance of the timeslot; and, responsive to determining that the user is likely to visit the place during the future instance of the timeslot, output information relating to the place prior to the beginning of the future instance of the timeslot.

BRIEF DESCRIPTION OF DRAWINGS

FIGS. 3A, 3B, and 3C illustrate visit likelihood distributions across time useful with the present disclosure;

DETAILED DESCRIPTION

The systems and techniques disclosed herein provide the ability to rank destinations based on the likelihood that a user actually visited that destination while present in a geographic area. In some examples, a geographic location from a user's location history can be used to perform a local search to find businesses or other destinations that are proximate to the user's geographical location. A technique that includes a time-based visit likelihood distribution can be applied to calculate a likelihood that the user actually visited the nearby destinations, and the destinations can be ranked based on this likelihood so that the most likely destinations can be used in further applications.

Certain examples will now be described to provide an overall understanding of the principles of the structure, function, manufacture, and use of the systems and techniques disclosed herein. One or more examples of these examples are illustrated in the accompanying drawings. Those skilled in the art will understand that the systems and techniques specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

A user's location can be inferred based on the location of the user's mobile device. Location information can be stored at various time intervals to provide a location history of the device and the user. This location history can be stored in a cache or other memory on the mobile device, and/or can be transmitted to a server over a mobile network and stored in a remote datastore. The user may be provided with an opportunity to control whether programs or features (e.g., executed by a computing device associated with or used by the user) collect user information (e.g., information about the user's location, or other information, such as about the user's contacts, social network connections, social actions or activities, preferences, or the like), and/or whether and/or how the user's mobile device is to receive content based on the collected information from a content server. In addition, certain data may be treated in one or more ways before it is stored or used, so that no personally identifiable information can be determined for the user. Further, a user's geographic location may be generalized with respect to where location information is obtained (such as to a city, ZIP code, or state level), so that a particular location of a user cannot be determined. In these ways, the user may have control over how information is collected and used by a content server.

Figure 1:
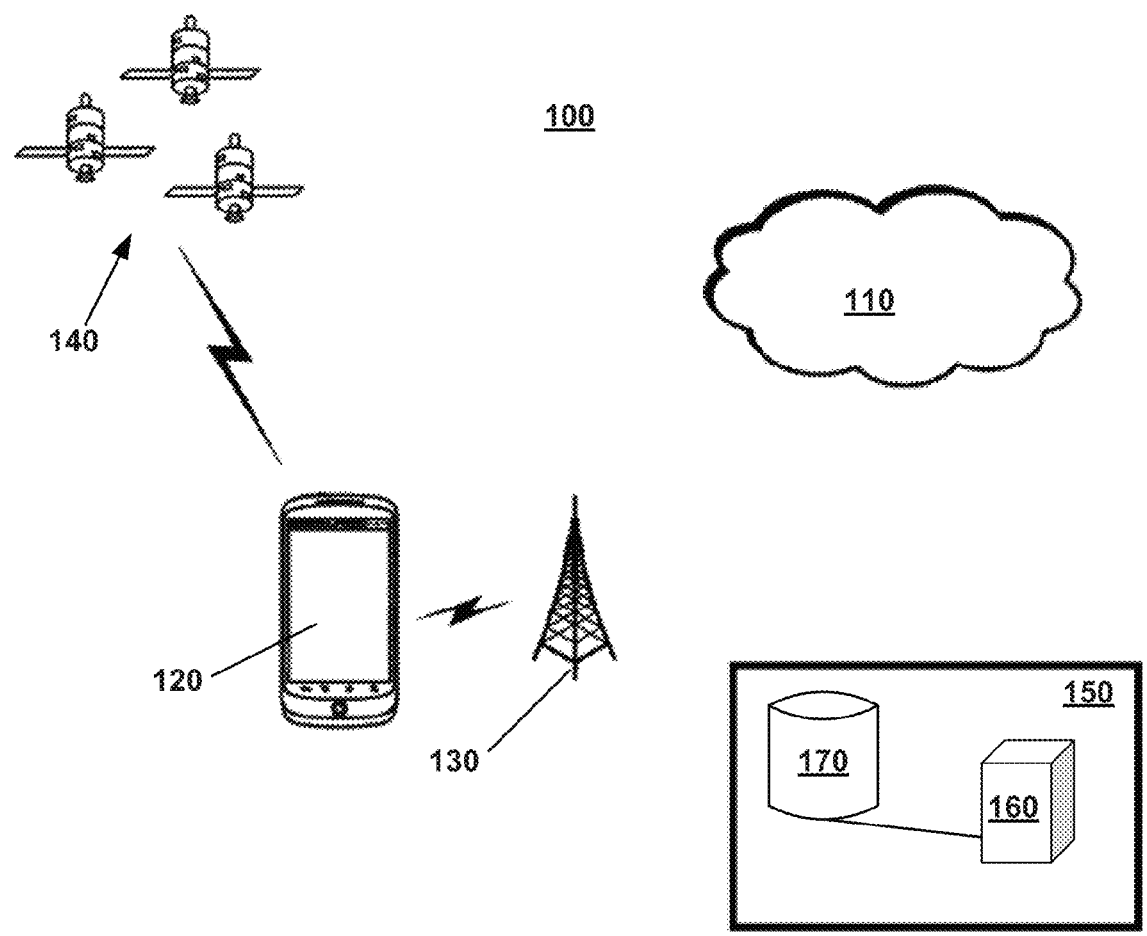
FIG. 1 schematically illustrates an example mobile network according to aspects of the present disclosure.

FIG. 1 illustrates an example of a mobile network 100 for providing location-based services. In the illustrated example, the mobile network 100 includes a communications network 110 and a mobile device 120. The mobile device 120 can connect to the communications network 110 via various access points 130. Although one mobile device 120 and one access point 130 is illustrated for example purposes, the mobile network can include any number of mobile devices and access points.

The mobile device 120 can be any device that is configured to exchange data over a mobile network, such as a mobile phone, tablet computer, laptop computer, and so forth. The mobile device 120 can also be or can include devices that are not necessarily "mobile," such as desktop computers. For example, the communications network 110 can be a GSM, TDMA, or CDMA technology enabled network or any other form of wireless network, e.g., IEEE 802.11, Bluetooth, or other Wi-Fi network, or a combination of wired and wireless networks. The access points 130 can be a form of radio receiver or transmitter that provides a gateway between the mobile device 120 and the communications network 110. For example, the access points can be wireless routers or cellular network towers. In some examples, the mobile device 120 can also receive GPS signals transmitted from GPS satellites 140.

In the illustrated example, the mobile network 100 also includes a location server 150 that can exchange data with the mobile device 120 via the communications network 110. The location server 150 can include, for example, a digital data processor 160 in communications coupling with a digital datastore 170.

The location server 150 can be implemented on one or more computing devices. Such computing devices may include, but are not limited to, one or more personal computers, workstations, mini-computers, clustered computer systems, and/or embedded systems. Some or all of the location server 150 functionality could also be implemented on the mobile device 120 itself. Such computing devices may also include, but are not limited to, a device having one or more processors and memory for executing and storing instructions. Such a computing device may include software, firmware, and hardware. Software may include one or more applications and an operating system. Hardware can include, but is not limited to, a processor, memory and graphical user interface display. The location server 150 may be implemented using hardware, software or a combination thereof and may be implemented in a computer system or other processing system.

Figure 2:
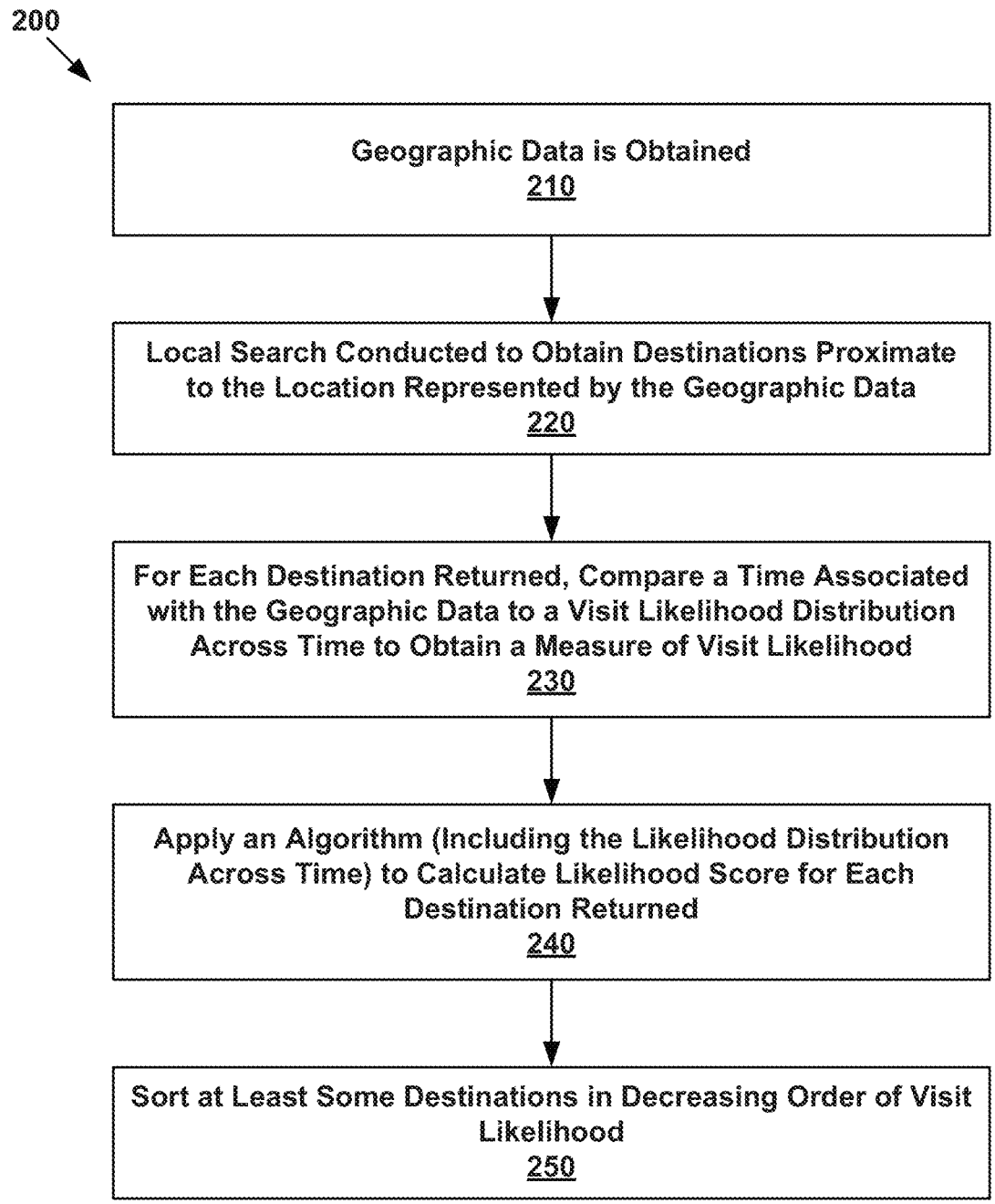
FIG. 2 is a flowchart of an example technique for sorting possible destinations visited by a user according to visit likelihood.

An example technique 200 for sorting, in order of decreasing visit likelihood, possible destinations visited by a user is illustrated in FIG. 2. The technique may include obtaining geographic location data, or it might operate on pre-existing location history data. As shown in FIG. 2, the technique 200 begins at step 210 where geographic location data is obtained. For example, the geographic location data can be obtained from location history data that is generated by a mobile device, such as the mobile device 120 of FIG. 1 and communicated to the location server 150 over the mobile network 100 via access points 130 and communications network 110. Location data can also be obtained by location server 150, such as when a user "checks in" at a location using any number of social application that provide for such check-ins.

The location data can be acquired by the mobile device using any of several technologies for determining position. For example, the location data can be acquired by the mobile device using a GPS receiver. The Global Positioning System (GPS) is a space-based satellite navigation system that provides location and time information anywhere on or near the Earth where there is an unobstructed line of sight to four or more GPS satellites. The system is freely accessible by anyone with a GPS receiver, and many smart phones and other mobile devices include GPS receivers. The location data can also be determined using other techniques, such as proximity to cell towers (or other mobile network access points) of known location, or triangulating between the mobile device and a plurality of such towers.

In some examples, location data can be acquired by the mobile device and stored locally in a memory on the device. The location data can, in some examples, be processed on the mobile device using a processor on the device. In other examples, the location data can be communicated to the location server for processing. For example, location data can be acquired and transmitted directly to the location server. In some examples, location data can be stored on the mobile device and transmitted to the location server at predetermined intervals. For example, location data acquired during a time period, e.g., a day, week, month, etc., can be stored on the mobile device, and transmitted to the location server at the end of that time period. In some examples, the location data can be acquired and stored on the mobile device until certain conditions are met, e.g., access to a wireless network, and then communicated to the location server. In some examples, the location data can be stored on the location server, e.g., in digital datastore 170 of FIG. 1, until data covering a plurality of days has been received. The location data can include both historical location data as well as current location data.

Location data can be acquired by the mobile device at various intervals. In an example, location data can be acquired by the mobile device at regular intervals during each day. For example, location data can be acquired several times per minute, once per minute, once per hour, once every two hours, or at any other time interval. For building a location history that is more useful with the techniques described herein, more frequent location sampling can be better than longer intervals between location data acquisition.

Location data can take the form of (longitude, latitude, date, time). Location data can also include an accuracy radius that represents an estimate of the accuracy of that location data point. The accuracy radius can range from meters to kilometers depending on the type of location data. For example, GPS location data can have an accuracy radius of several meters while cellular network tower location data can have an accuracy radius of several kilometers.

The location data can also be processed by the location server 150 in a number of ways. In particular, raw geographic location data can be processed to generate "visited place" geographic data. For example, location data can be processed to relate the raw location data to a place by calculating a centroid for a cluster of nearby location data points. A cluster of location data points can be defined as a set of location data points that are physically close to one another and a centroid can be defined as the geographic center of a cluster of data points. This can be referred to as distance-based clustering. For example, for a plurality of data points gathered during a period when the user is expected to be at home, e.g., during the night, there may be data points that correspond to different locations within the user's house, e.g., kitchen, bedroom, living room, etc. The location data for this period would show small variations in latitude and longitude, but would relate to a single place—the home. Accordingly, such points that are close in geography over time can be treated as a cluster that represents a single place. There may also be variability in the location data caused by inaccuracies in the location data that could be mitigated by such clustering.

In addition, other processing might include reverse geocode lookups to obtain information about the location, such as an address or a business name. For example, processes known as geocoding and reverse geocoding can be used to convert location data from geographic coordinates to human-readable addresses. Geocoding refers to a process in which a human-readable address, e.g., 1600 Amphitheatre Parkway, Mountain View, Calif., can be converted to location data in geographic coordinates, e.g., latitude 37.423021 and longitude −122.083739. Reverse geocoding refers to the reverse process, i.e., converting geographic coordinates into an address. Such information could be stored with the location data, or it could be used to form clusters—for example, by clustering location data that relates to a single address. This can be referred to as address-based clustering.

The data represented by such clustering could take the form of a longitude, a latitude, a start time, and an end time, where the longitude and the latitude are for the centroid and the start and end times represent the time span over which the user was present in a particular place. The clustered location data may also include a radius that can reflect inaccuracies in the location measurement, movement of the person within the cluster, or both. In addition, the data could reflect multiple visits to the same place within a user's location history data. In such an example, the data could include a vector of visit times, with each visit time including a (start time, end time) pair.

As shown in FIG. 2, the technique 200 continues at step 220 where a local search is conducted for a geographic location from a user's location history. The geographic location includes at least a position and a time. In some examples, the geographic location also includes a radius, or distance from the position. This radius can be derived from accuracy information relating to the technique of acquiring the geographic location, or it could be based upon variation in position within a cluster. Alternatively, a preselected value can be used. The purpose of conducting the local search is to return destinations proximate to the geographic location. In general, a destination is a business, address, or other mappable feature that can represent a place that might have been visited by the user. In some examples, the destination is a business.

The local search can be conducted on a local search engine. Local search engines are search engines that attempt to return business listings and/or relevant web pages within a specific geographical area. For a local search, a user may enter a search query and specify a geographical area near which the search query is to be performed. The local search engine returns relevant results, such as listings of businesses in the geographical area and/or relevant web pages pertaining to the geographical area, to the user.

In some examples, the local search is conducted by making a call to a local search engine with the geographic location from the user's history and a radius in which the search is to be performed. For example, the local search might be conducted for a latitude and longitude, along with a radius, such as, for example, 200 meters. The latitude and longitude are generally a point or the centroid of a cluster from the user's location history. The radius may be calculated as described above, or it might be preselected, such as 200 meters. The 200 meter radius can be helpful if the expected accuracy in the location data is on the order of 100 meters. In this way, one can be confident that the user's actual destination is within the area searched as part of the local search. In addition, the local search might include a limit N on the number of businesses from the area that are returned. For example, specifying N=10 might limit the number of results from within the 200 meter radius to 10.

In general, the local search can return the names of businesses within the radius. The local search might also return the distance between the business and the geographic location (or otherwise specify its relative position with respect to the geographic location). The local search might also return a category for each business located. For example, a restaurant might return a category of "food," while a hotel might return a category of "accommodation."

The local search might also return a "prominence score." A prominence score can be used to rank more prominent or well-known businesses ahead of less known businesses within the radius because it may be more likely that a user visited the better known business than the one that is geographically most proximate to the geographic location measurement. The location prominence score may be based on a set of factors that are unrelated to the geographical area over which the user is searching. In some implementations, the set of factors may include one or more of the following factors: (1) a score associated with an authoritative document (such as the Web page for the business); (2) the total number of documents referring to a business; (3) the highest score of documents referring to the business; (4) the number of documents with reviews of the business; and (5) the number of information documents that mention the business. In other implementations, the set of factors may include additional or different factors. Further information regarding prominence scores can be found in U.S. Pat. No. 7,822,751 to O'Clair et al., entitled "Scoring Local Search Results Based on Location Prominence," issued on Oct. 26, 2010 and assigned on its face to Google, Inc.

Referring back to FIG. 2, example technique 200 continues at step 230 where, for each destination returned by the local search engine, the time associated with the geographic location is compared to a visit likelihood distribution across time. As noted above, the time associated with a geographic location might be a single time and date stamp for a single location reading, or it might be a start time and an end time (for example, where the geographic location represents a cluster of locations over time), or it might be a time vector representing start and end times for a plurality of visits by the user to the same place.

Example visit likelihood distributions over time are illustrated in FIGS. 3A, 3B, and 3C. FIG. 3A provides a likelihood distribution for the category "food" 310. In this distribution, there are seven rows, with each row having 24 entries. The rows in this example represent days of the week, with the first row representing Sunday, the second row representing Monday, etc. Each row consists of 24 numbers, which represents the 24 hours in each day (for example, from hours 0 to 23). The numbers themselves represent the likelihood of a visit to a business of the type identified during the specified hour of the week. The numbers are in the range of [1, 9] where 1 means that a user is least likely to visit at this time and 9 means that the user is most likely to visit at this time. These are not actual probabilities and so need not total to one, or any other particular value.

Three distributions are provided in the figures, with FIG. 3A illustrating a distribution 310 for the category "food," FIG. 3B illustrating a distribution 320 for the category "accommodation," and FIG. 3C illustrating a distribution 330 for the category "administrative_area." As one might expect, the most likely times to visit a food business correspond to meal times, with the highest values occurring at noon, 1:00 pm, 6:00 pm, and 7:00 pm. The likelihood of visiting an accommodation is highest during sleeping times. In this way, for example, if a user visits a place having both a restaurant and a hotel, if it is 3:00 am it is more likely that they are visiting the hotel, while if it is 1:00 pm, it is more likely that they are visiting the restaurant. Similarly, for the administrative_area, the likelihood is very low during non-business hours.

The time-likelihood distributions need not take any particular format. For example, the distributions could be static, or they could be varied based on feedback from users, such as, for example, when they "check in" at a particular business using a mobile and/or social application. The distributions could also vary depending on the locale—dinner times in Barcelona, Spain for example, might be different than for Des Moines, Iowa. Still further, the distributions could be described by an equation rather than a table, and could have greater or lesser intervals between changes in likelihood.

Time can also be applied in the example technique using opening and closing times for the business that could be provided by the local search engine or by another kind of search engine. The local search might include, for example, the hours that a business is open so that these times might be compared to the visit times to aid in determining the likelihood that the user visited that business.

Returning again to FIG. 2, a visit likelihood is computed for each potential destination that is returned by the local search 240. This computation takes into account the distance of the destination from the geographic location, and also considers the visit likelihood across time, but can include other factors as well. In some examples, the computation takes place by taking each destination returned by the local search and performing the following steps on each in order to generate a likelihood (or a log(likelihood)). First, find the likelihood from the time distribution of likelihood for each time that the place was visited. If the business falls within more than one category having a distribution, the highest likelihood category might be used. An average likelihood can be obtained if there are more than one visit, and the log of that likelihood can be used as one portion of the overall likelihood that the user visited this destination. The log of the distance from the geographic location to the destination can be combined with the likelihood in a manner that results in nearby places scoring higher than those farther away. A log of the prominence score can also be added to the likelihood so that more prominent destinations can be scored more highly than less prominent destinations. Totaling these scores can provide a log(likelihood) total that can be used with the technique.

In a further example, the following formula can be used to calculate log(likelihood):

$$\log \text{likelihood} = a * \log(\text{prominence score}) - b * \log(\text{distance}) +$$
$$c * \log(\text{number of visits when the business was open}) -$$
$$d * \log(\text{number of visits when the business was closed}) +$$
$$e * \log(\text{average likelihood of this business category across visits})$$

In this example, multipliers a, b, c, d, and e are used to vary the amount of impact each element can have on the total likelihood score. This example also takes into account opening and closing times for the business in addition to the business category likelihood distribution across time. Other formulas may also be used to combine these or other factors into a score that reflects the likelihood that the user visited one or more of the destinations returned by the local search.

Referring again to FIG. 2, at step 250 at least some of the destinations are sorted in decreasing order of visit likelihood. In this way, further processing can take place with the added insight of having the user's possible destinations ranked in terms of the likelihood that the user actually visited them. In some examples, this information can be used to serve the user more relevant advertisements or match the user with more relevant information. That is, if, based on the user's location history, one could say that the user likely visited certain destinations, advertisements or other information that is relevant to that destination will likely be more relevant to the user. The user will receive better information because of the likelihood ranking.

Figure 4:
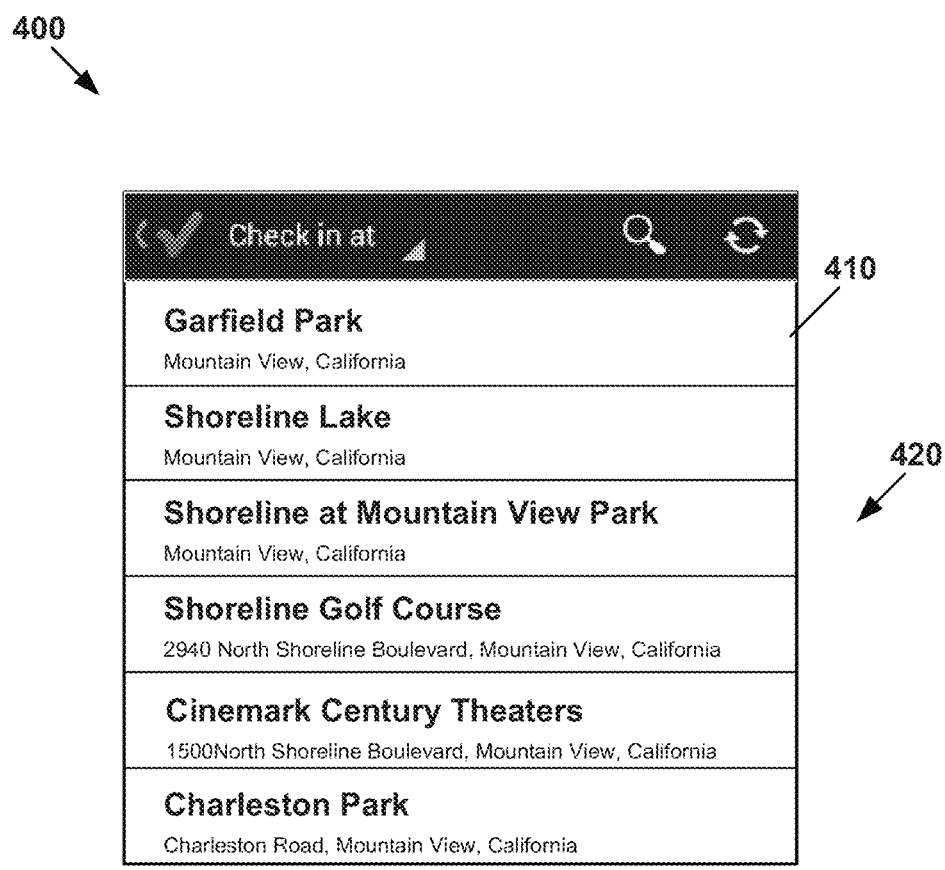
FIG. 4 illustrates an application of the disclosure to a user "check in" process.

In another example, the user can be provided with better information when attempting to check in using any number of social networking applications. Referring now to FIG. 4, a typical check in screen 400 for a social application running on a mobile device such as a smart phone is illustrated. In this example, a user is attempting to check in at a destination in Mountain View, Calif. The application, in this case running on a mobile device, provides the user with a list of destinations based upon the user's geographical location as measured on the mobile device. The closest destination 410 is listed at the top, with a list 420 of next nearest destinations provided below. The user can select one of these destinations in order to check in. Using techniques and systems described above, this list can be improved to show not only the closest destinations (keeping in mind that location determination is not always exact), but the destinations that the user most likely visited. That is, the destinations that the user likely visited will be placed at the top of the list, making it easier for the user to check in. In addition, where a user does check in to a destination, that fact can be factored back into the likelihood computation. For example, when a user visits the same geographic location in the future, the formula above could include the term "+f*log(number of times checked in at the destination)." In this way, the algorithm could factor in the likelihood that the user was returning to a place already visited.

Figure 5:
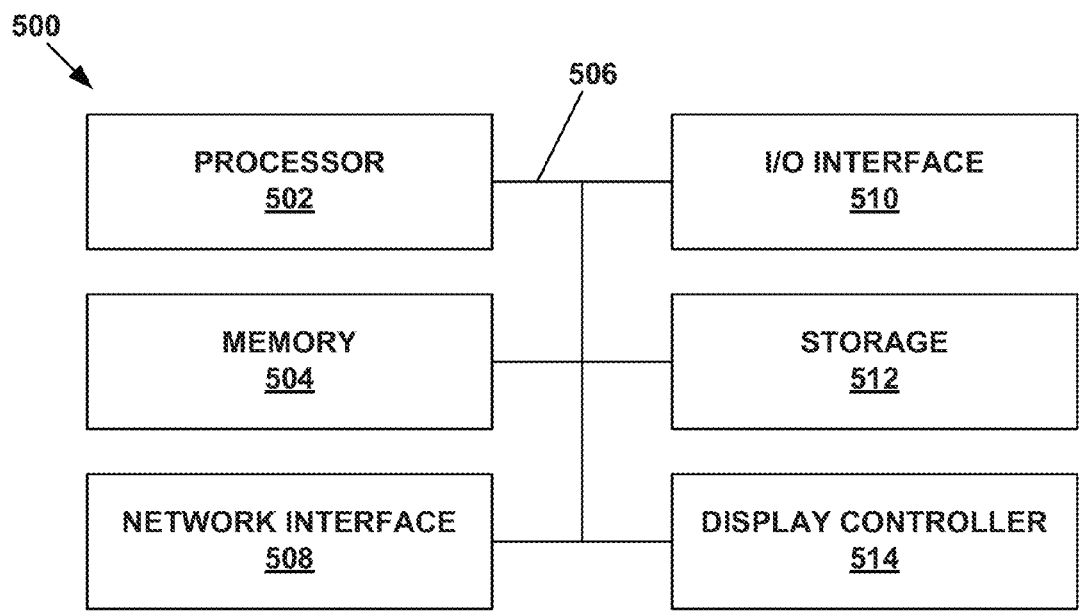
FIG. 5 is a schematic diagram of an example of a computer system.

FIG. 5 illustrates an example architecture of a computer system 500 which can be used to implement the mobile device 120 or the prediction server 150 of FIG. 1. Although an example computer system 500 is depicted and described herein, it will be appreciated that this is for sake of generality and convenience. In other examples, computer system 500 may differ in architecture and operation from that shown and described here.

The illustrated computer system 500 includes a processor 502 which controls the operation of the computer system 500, for example by executing an operating system (OS), device drivers, application programs, and so forth. The processor 502 can include any type of microprocessor or central processing unit (CPU), including programmable general-purpose or special-purpose microprocessors and/or any of a variety of proprietary or commercially-available single or multi-processor systems. The computer system 500 also includes a memory 504, which provides temporary or permanent storage for code to be executed by the processor 502 or for data that is processed by the processor 502. The memory 504 can include read-only memory (ROM), flash memory, one or more varieties of random access memory (RAM), and/or a combination of memory technologies. The various elements of the computer system 200 are coupled to a bus system 506. The illustrated bus system 506 is an abstraction that represents any one or more separate physical busses, communication lines/interfaces, and/or multi-drop or point-to-point connections, connected by appropriate bridges, adapters, and/or controllers.

The computer system 500 also includes a network interface 508, an input/output (I/O) interface 510, a storage device 512, and a display controller 514. The network interface 508 enables the computer system 500 to communicate with remote devices (e.g., other computer systems) over a network. The I/O interface 510 facilitates communication between one or more input devices, one or more output devices, and the various other components of the computer system 500. The storage device 512 can include any conventional medium for storing data in a non-volatile and/or non-transient manner. The storage device 512 can thus hold data and/or instructions in a persistent state (i.e., the value is retained despite interruption of power to the computer system 500). The storage device 512 can include one or more hard disk drives, flash drives, USB drives, optical drives, various media disks or cards, and/or any combination thereof and can be directly connected to the other components of the computer system 500 or remotely connected thereto, such as over a network. The display controller 514 includes a video processor and a video memory, and generates images to be displayed on one or more displays in accordance with instructions received from the processor 502.

Figure 6:
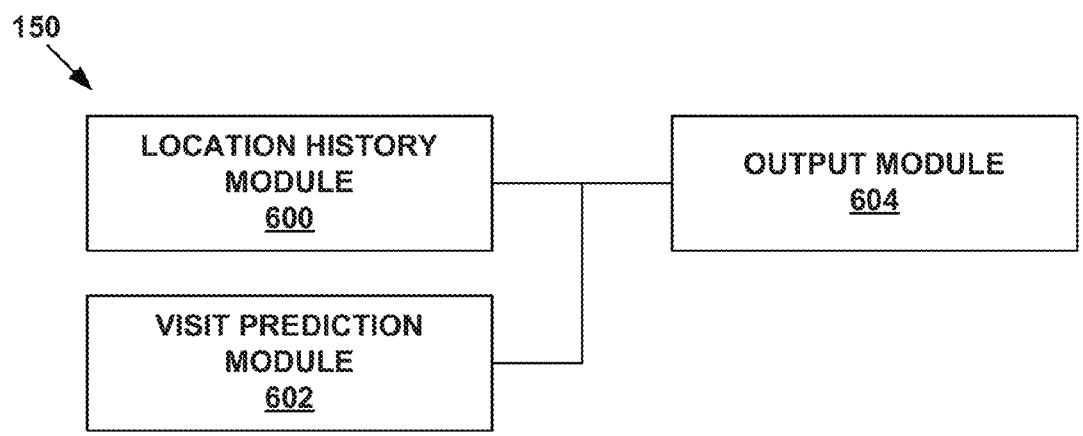
FIG. 6 is a schematic diagram of an example of a prediction server.

The various functions performed by the prediction server 150 or the mobile device 120 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules, and the prediction server 150 or the mobile device 120 can include fewer or more modules than what is shown and described herein. FIG. 6 is a schematic diagram of the modules of an example of the prediction server 150.

As shown in FIG. 6, the prediction server 150 can include a location history module 600 configured to receive and/or maintain a location history for each user of the prediction server 150.

In some instances, the current location of a user can be inferred from the current location of a mobile device or other object in the user's possession. In the example shown in FIG. 1, the mobile device 120 can be configured, for users who opt in and in accordance with published privacy policies, to periodically communicate its current location to the location history module 600 using the mobile network 100. This can occur several times per minute, once per minute, once per hour, or at any other regular or sporadic time interval. The mobile device 120 can determine or estimate its current location using any of a variety of known techniques, such as by processing GPS signals, by detecting proximity to cell towers, Wi-Fi hot spots, or other mobile access points 130 of known location, or by triangulating between the mobile device 120 and a plurality of such access points 130.

The location history module 600 can also receive the user's current location from other sources, such as when a user "checks in" at a location using any of a number of social applications that provide for such check-ins, when the user indicates their current position by dropping a pin at a particular location or making an equivalent selection using mapping software or when the user responds to a prompt for their current position.

The location history module 600 can be configured to store location data for the user in a location history. The location history can include a table of timestamps for which location data of the user is available and the locations corresponding to each timestamp. The location history can also include a time period during which a user was at a particular location, which can be specified by a start time and an end time. The locations can be specified in a format that includes a longitude, a latitude, and an accuracy radius. The accuracy radius can represent an estimate of the accuracy of the location data. The accuracy radius can range from meters to kilometers depending on the source of the location data. For example, location data derived from GPS signals can have an accuracy radius of several meters while location data derived from triangulation of cell towers can have an accuracy radius of several kilometers. The location history module 600 can also receive raw proximity or other data from the mobile device 120 and can perform any necessary triangulation or location calculations on the server side.

In some examples, the location history module 600 can be configured to receive the user's location history, or portions thereof, in batches instead of instantaneous data points. For example, the user's mobile device can be configured to store location data at various time intervals to build a location history of the device and the user. The user may be provided with an opportunity to control whether programs or features, e.g., executed by a computing device associated with or used by the user, collect user information (e.g., information about the user's location, or other information, such as about the user's contacts, social network connections, social actions or activities, preferences, or the like), and/or to control whether and/or how to receive content from a content server based on the collected information. In addition, certain data may be treated in one or more ways before it is stored or used, so that no personally identifiable information can be determined for the user, or a user's geographic location may be generalized where location information is obtained (such as to a city, ZIP code, or state level), so that a particular location of a user cannot be determined. In these ways, the user may have control over how information is collected and used by a content server.

The location history can be stored in a cache or other memory on the mobile device, and can be transmitted to the prediction server 150 over the communications network 110 at predetermined intervals. For example, location data acquired during a time period, e.g., a day, week, month, etc., can be stored on the mobile device, and transmitted to the prediction server 150 at the end of that time period. In some examples, the location data can be acquired and stored on the mobile device until certain conditions are met, e.g., access to a wireless network is available, and can then be communicated to the prediction server 150.

The location data in the user's location history can be processed in various ways by the mobile device 120 and/or the prediction server 150. For example, location data can be processed to relate the raw location data to a visited place by calculating a centroid for a cluster of nearby location data points. A cluster of location data points can be defined as a set of location data points that are physically close to one another and a centroid can be defined as the geographic center of a cluster of data points. This can be referred to as distance-based clustering. For example, for a plurality of data points gathered during a period when the user is at home, there may be data points that correspond to different locations within the user's house, e.g., kitchen, bedroom, living room, etc. The location data for this period would show small variations in latitude and longitude, but would relate to a single place—the user's home. Accordingly, such points that are geographically proximate over time can be treated as a cluster that represents a single place. There may also be variability in the location data caused by inaccuracies in the data, the effect of which can be limited or removed by such clustering. The data represented by such clustering can be specified as series of time stamps, each with a corresponding location (e.g., a longitude and a latitude of the centroid), or can be specified as a start time, an end time, and a corresponding location.

Processing of location data can also include obtaining additional information corresponding to a geographic location, such as an address or a business name associated with that location. For example, processes known as geocoding and reverse geocoding can be used to convert geographic coordinates into human-readable places and vice versa. Geocoding refers to a process in which a query (e.g., a human-readable address such as "1600 Amphitheatre Parkway, Mountain View, Calif.") can be converted to location data in geographic coordinates (e.g., latitude 37.423021 and longitude −122.083739). Reverse geocoding refers to the reverse process, i.e., converting geographic coordinates into an address, place, etc. This information can be stored with the location data in the user's location history or can be used to form clusters—for example, by clustering location data that relates to a single address. This can be referred to as address-based clustering.

The location history module 600 can thus receive and/or maintain a location history for each user of the prediction server 150 indicating a plurality of places that were previously visited by that user.

The prediction server 150 can also include a visit prediction module 602 configured to process the location history received or maintained by the location history module 600 and to predict places that the user is likely to visit in the future. The visit prediction module 602 can use various probabilistic and other models to make such predictions.

In some examples, the visit prediction module 602 can employ a Markov chain model to predict future visits to places that the user has visited in the past on a semi-regular basis. Such a model can be particularly effective for making predictions based on piecewise-stationary behavior (i.e., when a user does something almost regularly for a long period and then abruptly changes behavior to a new pattern), as it can quickly pick up on new patterns following a behavior change.

Figure 7:
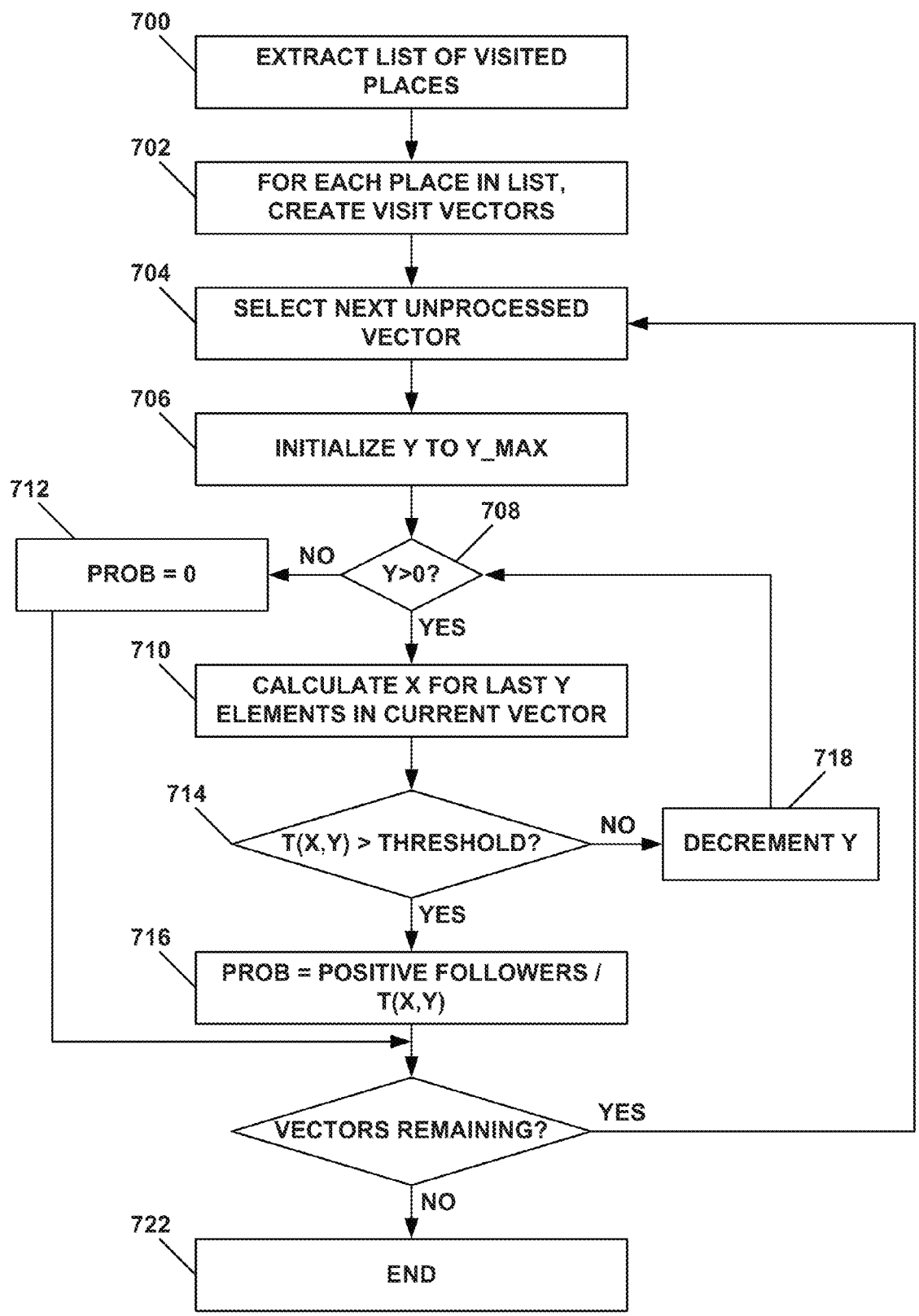
FIG. 7 is a flowchart that schematically depicts an example technique of predicting future visits based on location history.

FIG. 7 illustrates an example prediction technique that can be performed by the visit prediction module 602 in such examples. While various techniques disclosed herein may be shown in relation to a flowchart or flowcharts, it should be noted that any ordering of technique steps implied by such flowcharts or the description thereof is not to be construed as limiting the technique to performing the steps in that order. Rather, the various steps of each of the techniques disclosed herein can be performed in any of a variety of sequences. In addition, as the illustrated flowchart(s) are merely examples, various other techniques that include additional steps or include fewer steps than illustrated are also within the scope of the present disclosure.

The illustrated technique begins at step 700, in which the visit prediction module 602 extracts a list of visited places from the user's location history. As noted above, distance-based, address-based, or other clustering techniques can be used to prevent location data points that differ slightly but correspond to the same general place from being interpreted as two separate places, thereby preventing duplicative listings in the list of visited places. Additionally, the user may be provided with an opportunity to control whether programs or features, e.g., executed by a computing device associated with or used by the user, collect user information (e.g., information about the user's location, or other information, such as about the user's contacts, social network connections, social actions or activities, preferences, or the like), and/or to control whether and/or how to receive content from a content server based on the collected information. In addition, certain data may be treated in one or more ways before it is stored or used, so that no personally identifiable information can be determined for the user, or a user's geographic location may be generalized where location information is obtained (such as to a city, ZIP code, or state level), so that a particular location of a user cannot be determined. In these ways, the user may have control over how information is collected and used by a content server.

In step 702, the visit prediction module 602 creates, for each place in the list of visited places generated in step 700, a plurality of visit vectors, each visit vector corresponding to a particular timeslot. Each visit vector thus corresponds to a visited place and a timeslot. A visit vector can include a stream of Boolean values (e.g., 0 or 1, F or T, etc.). Each element in the stream corresponds to an instance of the timeslot to which the vector corresponds, and the value of each element indicates whether the user visited the place to which the vector corresponds during the timeslot instance represented by that element. For example, a visit vector can be defined that corresponds to a visited place "Place A" and a timeslot "Tuesday at 4:00 PM." In this case, each element in the vector corresponds to a unique instance of the Tuesday at 4:00 PM timeslot (e.g., Tuesday at 4 PM during a first week, Tuesday at 4 PM during a second week, and so on). An element having a value of "T" indicates that the user visited Place A on Tuesday at 4 PM on the week represented by the element, whereas an element having a value of "F" indicates that the user did not visit Place A on Tuesday at 4 PM on the week represented by the element.

The number of timeslots for which vectors are created can vary between examples. For example, in some examples, the visit prediction module 602 can create 48 vectors for each location in the list of visited places, each vector corresponding to one of 48 time slots representing the next 48 hours from the user's current time. In other examples, the visit prediction module 602 can create 7 vectors for each location in the list of visited places, each vector corresponding to one of 7 time slots representing the next 7 days from the user's current time.

The way in which timeslots are defined can vary between examples. In addition, a single timeslot definition can be used, or the visit prediction module 602 can create visit vectors using a plurality of different timeslot definition schemes and make predictions based on one or more of said schemes. Example timeslot definition schemes include the following.

In a first timeslot definition scheme, timeslots can be defined based on a particular day of the week and a particular time of the day (e.g., Tuesday at 4:00 PM or Saturday at 9:00 AM). In such a definition, instances of each timeslot occur at a weekly frequency. Thus, an example visit vector of length 4 (i.e., a vector having four elements corresponding to four instances of the timeslot) can be specified as: (Tuesday of Week 1 at 4:00 PM, Tuesday of Week 2 at 4:00 PM, Tuesday of Week 3 at 4:00 PM, Tuesday of Week 4 at 4:00 PM), where weeks 1, 2, 3, and 4 are consecutive weeks. If the user visited the place to which the vector corresponds every other Tuesday at 4:00 PM, the visit vector above would be TFTF. If the user never visited the place on Tuesdays at 4:00 PM, the visit history vector would be FFFF. If the user visited the place every Tuesday at 4:00 PM, the visit history vector would be TTTT.

In a second timeslot definition scheme, timeslots can be defined based only on a particular time of day (e.g., 12:00 PM or 3:00 PM). In such a definition, instances of each timeslot occur at a daily frequency. Thus, an example visit vector of length 4 can be specified as: (Day 1 at 12:00 PM, Day 2 at 12:00 PM, Day 3 at 12:00 PM, Day 4 at 12:00 PM), where days 1, 2, 3, and 4 are consecutive days. If the user visited the place to which the vector corresponds at 12:00 PM only on days 2 and 3, the visit vector would be FTTF.

In a third timeslot definition scheme, timeslots can be defined based on a particular weekday at a particular time of the weekday. In such a definition, instances of each timeslot occur at a weekday frequency. Thus, an example visit vector of length 4 can be specified as: (Weekday 1 at 3:00 PM, Weekday 2 at 3:00 PM, Weekday 3 at 3:00 PM, Weekday 4 at 3:00 PM), where weekdays 1, 2, 3, and 4 are consecutive weekdays (e.g., Monday-Tuesday-Wednesday-Thursday or Thursday-Friday-Monday-Tuesday).

In a fourth timeslot definition scheme, a single timeslot can be defined as either or both of the two weekend days. In such a definition, instances of the timeslot occur at a weekly frequency. Thus, an example visit vector of length 4 can be specified as: (Week 1, Week 2, Week 3, Week 4), where weeks 1, 2, 3, and 4 are consecutive weeks. In this scheme, a week can be defined as starting on a Monday and ending on a Sunday (such that the Saturday of a particular week and the Sunday of a particular week occur on consecutive days). If the user visited the place to which the vector corresponds on Saturday of week 1 and Sunday of week 4, but did not visit the location on any weekend days in weeks 2 or 3, the visit vector would be TFFT. Similarly, if the user visited the place every Saturday during weeks 1 through 4, the visit vector would be TTTT.

In a fifth timeslot definition scheme, a single timeslot can be defined as at least one of the four weekend days in a two week period. In such a definition, instances of the timeslot occur at a frequency of every two weeks. Thus, an example visit vector of length 4 can be specified as: (Weeks 1 and 2, Weeks 3 and 4, Weeks 5 and 6, Weeks 7 and 8), where weeks 1 through 8 are consecutive weeks. In this scheme, a week can be defined as starting on a Monday and ending on a Sunday (such that the Saturday of a particular week and the Sunday of a particular week occur on consecutive days). If the user visited the place to which the vector corresponds on Saturday of week 1 and Sunday of week 6, but did not visit the place on any other weekend days, the visit vector would be TFTF.

It will be appreciated that any of a number of other timeslot definitions can be used in various examples without departing from the scope of the present disclosure.

In some examples, the visit prediction module 602 can create 48 visit vectors for each location that appears in the user's location history. The 48 visit vectors correspond to 48 hour-long timeslots immediately following the user's current time, and are defined according to the first timeslot definition scheme described above. Thus, if the technique of FIG. 7 is executed at 10:00 PM on Tuesday, visit vectors for each location would be created for 11:00 PM Tuesday, 12:00 AM Wednesday, 1:00 AM Wednesday, . . . , 9:00 PM Thursday, and 10:00 PM Thursday.

Beginning in step 704, the visit vectors created in step 702 can be processed to make visit predictions. In the following discussion, a set of consecutive elements in a visit vector can be referred to as a "sub-stream." An attribute X can be defined for a sub-stream as the number of positive elements in the sub-stream. An attribute Y can be defined for a sub-stream as the total number of elements in the sub-stream. A sub-stream can thus be classified according to a pair (X,Y). Synonymously, a sub-stream can be referred to as being "of type (X,Y)" or as being "a (X,Y) sub-stream."

The visit prediction module 602 can execute a function TotalExamples(X,Y), or "T(X,Y)" on a particular visit vector to return the number of times that sub-streams of type (X,Y) occur in that visit vector. Only sub-streams that are followed in the visit vector by a subsequent element that can be used to inform a prediction are counted by the TotalExamples function. The TotalExamples function can have three inputs: a visit vector to be processed, a value X indicating the number of positive values in the sub-stream type to be counted, and a value Y indicating the length of the sub-stream type to be counted. Thus, executing the function T(2,3) on a visit vector V would return the total number of sub-streams in V that have a length of three, include exactly two positive elements, and are followed by a subsequent element.

Consider an example visit vector V=TFTF. In this visit vector, T(2,3) would return a value of "1" because there is only one sub-stream in the vector (the sub-stream that consists of TFT) that has exactly two positive values, a length of three, and that is followed by a subsequent element. This sub-stream is followed in the visit vector by subsequent element F. The visit prediction module 602 can calculate a probability quotient as the number of times that historical occurrences of the most recent sub-stream in the vector are followed by a positive element, divided by the number returned by the TotalExamples function. This probability quotient can be interpreted as a percentage likelihood of the user visiting the place represented by the vector in the next instance of the timeslot represented by the vector. In the example vector V above, the number of times that a sub-stream of type (2,3) is followed by a positive element is 0. Accordingly, if a sub-stream of type (2,3) is encountered in the future as the most recent sub-stream in the visit vector, the visit prediction module 602 can find that there is a 0/1=0 percent chance of the user visiting the place in the next instance of the timeslot to which the vector corresponds.

In the same visit vector V, T(1,2) would return a value of "2" because there are two sub-streams in the vector (the first sub-stream that consists of TF and the sub-stream that consists of FT) that have exactly one positive value, a length of two, and that are followed by a subsequent element. The second sub-stream that consists of TF is not included in the count because it is not followed by a subsequent element (i.e., it is the most-recent sub-stream in the vector). The first sub-stream TF is followed by subsequent element T. The sub-stream FT is followed by subsequent element F. Thus, if a sub-stream of type (1,2) is encountered in the future as the most recent sub-stream in the visit vector, the visit prediction module 602 can find that there is a 1/2=50 percent chance of the user visiting the place in the next instance of the time slot to which the vector corresponds.

In the same visit vector V, T(1,1) would return a value of "2" because there are two sub-streams in the vector (the first sub-stream that consists of T and the second sub-stream that consists of T) that have exactly one positive value, a length of one, and that are followed by a subsequent element. In both cases, the sub-stream T is followed by subsequent element F. Thus, if a sub-stream of type (1,1) is encountered in the future as the most recent sub-stream in the visit vector, the visit prediction module 602 can find that there is a 0/2=0 percent chance of the user visiting the place in the next instance of the time slot to which the vector corresponds.

In the same visit vector V, T(0,1) would return a value of "1" because there is only one sub-stream in the vector (the first sub-stream that consists of F) that has zero positive values, a length of one, and that is followed by a subsequent element. The second sub-stream that consists of F is not included in the count because it is not followed by a subsequent element (i.e., it is the most-recent sub-stream in the vector). The first sub-stream F is followed by subsequent element T. Thus, if a sub-stream of type (0,1) is encountered in the future as the most recent sub-stream in the visit vector, the visit prediction module 602 can find that there is a 1/1=100 percent chance of the user visiting the place in the next instance of the time slot to which the vector corresponds.

As multiple of these cases can be applicable to a given visit vector, the system can select a model or models on which to base its prediction based on which has the most evidence and the most detail. In other words, the order of the Markov model (the Y value) can be selected to balance more evidence (more occurrences of a sub-stream of interest) with more detail (more elements in the sub-stream of interest). This can be performed by iteratively analyzing the visit vector using different values for Y (i.e., different order Markov chain models), or in some other fashion.

In the illustrated technique, a first visit vector is selected for processing in step 704. Then, in step 706, the visit prediction module 602 starts with an upper bound Y_MAX for Y (e.g., Y=4) and selects as a sub-stream of interest the last Y elements in the visit vector (e.g., the 4 most-recent elements when Y=4). In decision block 708, it is determined whether Y is greater than zero. If Y is greater than zero, execution proceeds to step 710. Otherwise, a probability of zero is returned in step 712 and execution proceeds to decision block 720.

In step 710, the visit prediction module 602 counts the number of positive elements in the sub-stream of interest to obtain a value for X. Thus, if the initial value for Y is 4, and the last four elements of the visit vector are FTTF, then X is determined to be 2 because there are two positive elements in this portion of the visit vector. In this example, the sub-stream of interest is determined to be of type (2,4). The visit prediction module 602 then executes the TotalExamples function on the visit vector using these values of X and Y to count the number of times that a sub-stream of type (X,Y) occurs in the overall visit vector. If the TotalExamples function returns a value of zero or a very small value (e.g., less than 5, less than 3, or less than 2), the visit prediction module 602 can determine that the initial value for Y is too large to obtain meaningful historical information on which to base a prediction. In other words, the model has too much detail and not enough evidence. Thus, in decision block 714, the value returned by T(X,Y) is compared to a threshold value. If T(X,Y) is greater than the threshold value, execution proceeds to step 716. Otherwise, Y is decremented (e.g., decremented by one) in step 718 and execution returns to decision block 708, causing the above process to be repeated for the new value of Y.

This process can repeat until the value returned by the TotalElements function in decision block 714 exceeds the predetermined threshold number. In some examples, the threshold number can be 3. Once the threshold number is obtained or exceeded, a probability of the user visiting the place represented by the visit vector in the next instance of the timeslot represented by the visit vector is calculated in step 716. The visit prediction module 602 can accomplish this by counting how many times sub-streams of type (X,Y) were followed by a positive element in the visit vector, and then dividing this count by the result of T(X,Y). This ratio can indicate the estimated probability of a positive element following the sub-stream of interest. The probability estimated for each vector can be stored in a memory by the visit prediction module 602.

Execution then proceeds to decision block 720, where it is determined whether any unprocessed visit vectors remain. If unprocessed visit vectors remain, execution returns to step 704 where the next unprocessed visit vector is selected and processed as described above. Otherwise, execution ends in step 722.

In the more-detailed example that follows, it is assumed that 6 months' worth of location data is stored in the user's location history. In the location history, the place "Restaurant A" (one of the user's favorite restaurants) appears several times. Accordingly, the system creates a plurality of visit vectors for Restaurant A, each corresponding to a different timeslot. It is assumed that the visit vector for the Wednesday 6:00 PM time slot is as follows:

TFFFTTFTFTFTTFFFTFTFTFTFTT

Because the location history consists of 6 months (or 26 weeks) of location data, there are 26 instances of the Wednesday 6:00 PM time slot and the visit vector for the Wednesday 6:00 PM time slot has a length of 26. A positive element in the vector indicates that the user visited Restaurant A at 6:00 PM on the Wednesday of the week represented by that element's position in the vector. In this case, the last three elements in the vector are FTT, indicating that the user visited Restaurant A at 6:00 PM the last two Wednesdays but did not visit Restaurant A at 6:00 PM three Wednesdays ago.

Starting with an initial value of Y=4, a value of X=3 is obtained. (There are three positive elements in the last four elements of the vector). T(3,4) returns a value of 2, because there are only two (3,4) sub-streams in the vector that are followed by a subsequent element:

TTFT (which is followed by F), and
TFTT (which is followed by F).

Since T(3,4)=2 is less than the threshold amount (3 in this example), Y is decremented by one and the process repeats.

Using a new value of Y=3, a value of X=2 is obtained. (There are two positive elements in the last three elements of the vector). T(2,3) returns a value of 11, because there are eleven sub-streams of type (2,3) in the vector that are followed by a subsequent element:

FTT (which is followed by F),
TTF (which is followed by T),
TFT (which is followed by F),
TFT (which is followed by F),
TFT (which is followed by T),
FTT (which is followed by F),
TTF (which is followed by F),
TFT (which is followed by F),
TFT (which is followed by F),
TFT (which is followed by F), and
TFT (which is followed by T).

Since T(2,3)=11 is greater than the threshold amount (3 in this example), the returned data can be used to form a predication. As shown, there are three (2,3) sub-streams that are followed by a positive element, and a total of eleven (2,3) sub-streams. Accordingly, the visit prediction module 602 can determine that there is a 3/11 or 27 percent chance that the user will visit Restaurant A next Wednesday at 6 PM. This probability can be stored in association with the visit vector. As discussed below with respect to the output module 604, this probability determination can be used to decide whether to automatically provide the user with information about Restaurant A (e.g., the weather in the city or town in which Restaurant A is located, the traffic on the route between the user's current location and the location of Restaurant A, etc.).

In the technique of FIG. 7, a probability of zero is returned when there is insufficient location history data for a particular place to make a confident prediction as to whether a user will visit that place in the future (e.g., when no value of Y returns greater than a threshold number of sub-stream instances). In some examples, however, the visit prediction module 602 can alternatively form a prediction using other sources of information. For example, instead of limiting its analysis to the user's location history data for the particular place, the visit history module 602 can use location history data for all places that are of a similar type to the particular place. Thus, for example, if insufficient location history data exists to make a prediction about a place Restaurant A, the visit prediction module 602 can base its prediction on the user's past visits to any restaurant. Or, if Restaurant A is an Italian restaurant, the visit prediction module 602 can base its prediction on the user's past visits to any Italian restaurant.

If there is still insufficient information to make a confident prediction, the visit prediction module 602 can base its prediction on location history data for other users of the prediction server 150. For example, the visit prediction module 602 can rely on visits to the particular place by all other users. The visit prediction module 602 can also rely on visits to the particular place by other users that are of a similar demographic to the current user (e.g., other users who also have children, or other users of the same age). The visit prediction module 602 can also rely on visits to places of the same type by other users (e.g., visits to Italian restaurants generally as opposed to visits to the particular restaurant in question).

While a Markov chain model is described above, other techniques can be used to make a prediction about whether a user will visit a place in the future. For example, instead of iteratively decrementing Y until a suitable or threshold number of sub-stream instances are found, the visit prediction module 602 can use a beta-prior technique.

In a beta prior technique, the visit prediction module 602 calculates a probability based on all values of Y between Y=1 and Y=Y_MAX. The probabilities calculated for each value of Y are then adjusted based on a confidence factor to form a prediction.

The above techniques can be particularly useful in making predictions about places that are visited relatively frequently (e.g., on a semi-regular basis). For places that are visited less-frequently, the visit prediction module 602 can use other techniques.

For example, a random forest model can be used by the visit prediction module 602 to make predictions about places that are visited less-frequently. Instead of forming visit vectors based on instances of a particular timeslot, visit vectors can be created for visited places based on the amount of time elapsed between each visit to that place. In other words, each element in the visit vector represents a visit, and the value of each element represents the amount of time elapsed since that visit occurred (e.g., the number of days, weeks, months, and so on) Thus, a place that is visited every other Saturday would have a visit vector specified as (14, 28, 42, 56, 70). The visit vector can also be specified such that the values of each element represent the number of days elapsed between successive visits. Thus, a place that is visited every other Saturday could also have a visit vector specified as (14, 14, 14, 14, 14). To obtain a visit vector of a particular length when fewer than the necessary number of visits exist, the vector can be padded with zeroes. So for example if a visit vector of length 5 is desired but only two visits exist, the vector can be specified as (0, 0, 0, 14, 28).

After obtaining visit vectors for each location, a machine learning system can be used to predict whether the user will visit the place again in a particular window of time (e.g., in the next week, in the next 10 days, in the next month, etc.). A variety of machine learning systems known in the art can be used for this purpose, such as the WEKA open source machine learning toolkit. In general, the machine learning system has two inputs.

First, the machine learning system is provided with a training set of various vectors followed by a yes or a no. The training vectors can be visit vectors selected from a variety of sources (e.g., the current user's location history, the location history for all users, the location history for all users of a particular demographic, location history for a particular place, location history for places of a particular type, and so forth).

Second, the machine learning system is provided with a query vector. The query vector can be the vector of the current user's past visits to the place in question.

The machine learning system looks at past occurrences of this vector in the training set and at what happened after this vector was encountered (e.g., whether and when a subsequent visit occurred). The machine learning system follows a series of decision trees, as opposed to merely calculating a probability, and outputs a prediction as to whether the user is likely to visit the place in the next week, two weeks, month, etc.

In some examples, other learning models can be used, such as one that models visits based on a continuous, slowly-changing behavior assumption. Such models can use longer vectors as evidence but down-weigh visits based on how long ago they occurred.

The prediction server 150 can also include an output module 604 configured to output information about places the user is predicted to visit. For example, the output module 604 can send a text message, email, or push notification to the user's mobile device including such information. By way of further example, the output module 604 can output an instruction that instructs the user's mobile device to display the information, or to direct the mobile device's web browser to a website containing the information. Outputs generated by the output module 604 can be sent as data transmissions via the mobile network 100 to the mobile device 120, which can in turn be configured to display or otherwise present the output to the user. The presentation to the user can be in a standalone application, a device home screen, a native application, or in any other program executed on the mobile device.

In some examples, the output module 604 can determine whether to output information by comparing the probabilities generated for each visit vector by the visit prediction module 602 to a predetermined threshold probability. Example threshold probabilities can include 10%, 20%, 30%, 40%, 50%, 60%, 70%, 80%, 90%, or any other value determined to be useful through routine experimentation. Information relating to the place to which a vector corresponds can be output if the probability stored in association with that vector exceeds the threshold. Thus, if the threshold probability is 20%, and the visit prediction module 602 determines that there is a 60% chance that a user will visit Restaurant A on Wednesday at 6:00 PM, the output module 604 can output information relating to Restaurant A. The timing of the output can vary from one example to the next, however, in some examples, the output is performed shortly before the relevant timeslot. Thus, in the example above, the output can be generated at 5:00 PM on Wednesday, one hour before the relevant 6:00 PM timeslot.

Any of a variety of types of information available from the Internet or from the user's mobile device that relates to the relevant place and/or the relevant timeslot can be output by the output module 604. For example, the output module 604 can output a traffic update for the user's route to the relevant place, a weather forecast for the relevant place, contact information of the user's contacts who live or work near the relevant place, news stories about the relevant place, and so forth.

Figure 8:
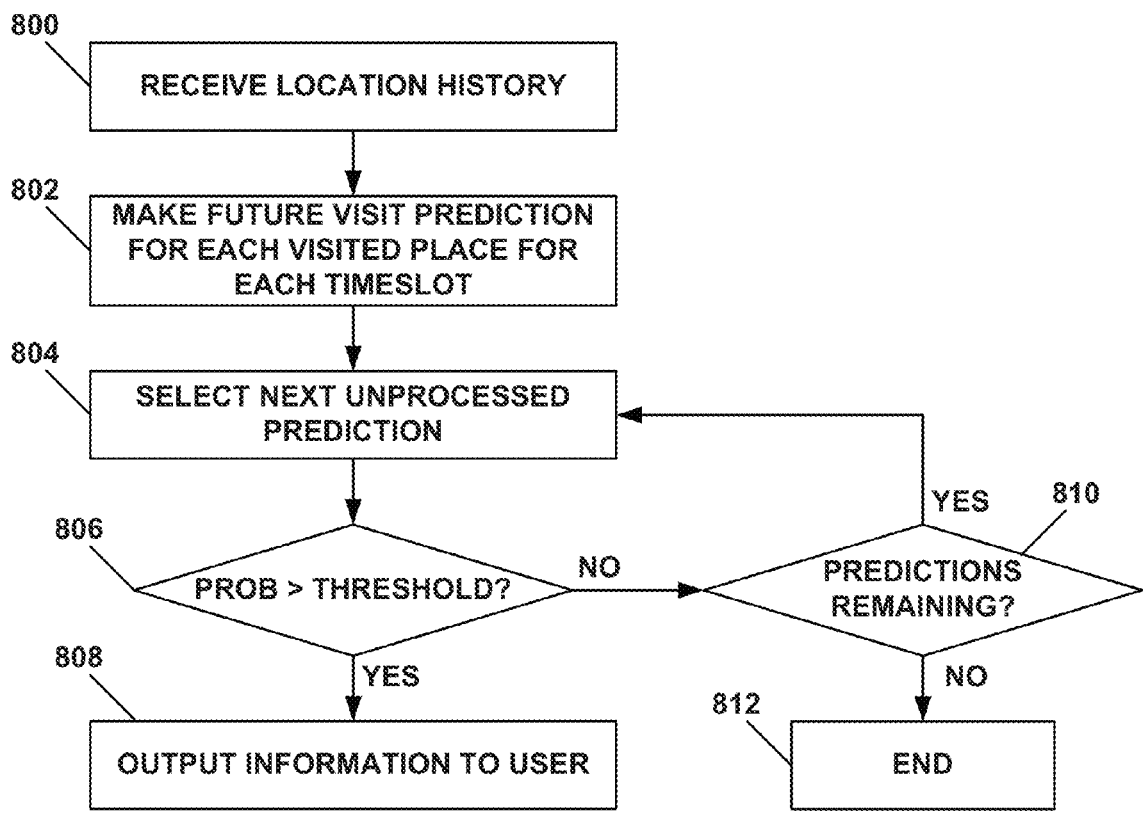
FIG. 8 is a flowchart that schematically depicts an example technique of outputting information relating to places that a user is predicted to visit.

An example technique of outputting information relating to places that a user is predicted to visit is shown in FIG. 8. The technique of FIG. 8 can run periodically or sporadically at any of a variety of timings. In some examples, the technique is executed by the prediction server 150 nightly.

The technique begins at step 800 where the user's location history is received or retrieved by the location history module 600. It will be appreciated that the location history module 600 can itself maintain the user's location history, in which case it may not be necessary to actively receive or retrieve it. Next, in step 802, the visit prediction module 602 makes future visit predictions for each visited place in the user's location history for each of one or more timeslots. The visit prediction module 602 can generate a prediction for each place/timeslot combination, e.g., in the form of a percentage likelihood that a user will visit the place during the timeslot as described above with respect to the technique of FIG. 7.

In step 804, a first of said predictions is selected for analysis. The probability or other quantitative value of the prediction is compared to a threshold amount in decision block 806.

If the probability exceeds the threshold, information relating to the place and/or the timeslot is output for presentation to the user in step 808. If the probability does not exceed the threshold, it is determined in decision block 810 whether any unprocessed predictions exist. If so, execution returns to step 804 where the next unprocessed prediction is selected and processed as described above. If no unprocessed predictions remain, execution ends at step 812.

Accordingly, using the illustrated technique, a user can be automatically provided with information relating to a place that they are likely to visit in the near future, without requiring the user to actively or manually seek out the information.

Figure 9:
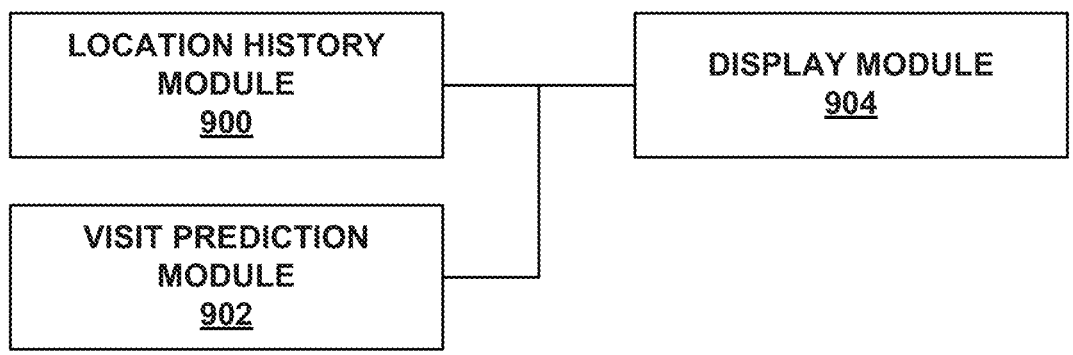
FIG. 9 is a schematic diagram of an example of a mobile device.

In some examples, some or all of the functionality disclosed above as being performed by the prediction server 150 can instead be performed by the mobile device 120. FIG. 9 is a schematic diagram of the modules of a mobile device for use in such an example. The structure and function of the mobile device illustrated in FIG. 9 is substantially similar to that of the prediction server of FIG. 6, except as noted herein and as will be readily apparent to those having ordinary skill in the art. Accordingly, a detailed description thereof is omitted here for the sake of brevity.

As shown in FIG. 9, the mobile device can include a location history module 900 and a visit prediction module 902 that function in the same manner as those disclosed above with respect to the prediction server 150, except that data stored or produced by a remote server can be accessed by those modules using one or more calls to the remote server, for example using the mobile network 100. The mobile device can also include a display module 904 which operates in the same way as the output module 604 above, and that is configured to display information relating to places the user is predicted to visit, for example on a display screen of the mobile device.

In a first aspect, a technique is provided for sorting, in order of decreasing visit likelihood, possible destinations visited by a user based on a geographic location from a user's location history. For a geographic location from a user's location history, a processor conducts a local search for destinations proximate to that geographic location, where the geographic location has a time associated with it and the search provides at least a name for the destination and a distance from the geographic location. The processor computes, for each destination returned by the local search, a visit likelihood, where the visit likelihood is computed as a function of at least the distance between the destination and the geographic location and a comparison between the time associated with the geographic location and a visit likelihood distribution across time. The processor further sorts at least some of the destinations returned by the local search in decreasing order of visit likelihood to select the most likely visited destination for that geographic location.

In a further aspect, a technique is provided for sorting, in order of decreasing visit likelihood, possible destinations visited by a user based on a geographic location from a user's location history. For a geographic location from a user's location history, a processor conducts a local search for destinations proximate to that geographic location, where the geographic location has a time vector associated with it (the time vector including start and end times for a plurality of visits) and the search provides at least a name for the destination and a distance from the geographic location. The processor computes, for each destination returned by the local search a visit likelihood, a visit likelihood as a function of at least the distance between the destination and the geographic location and a comparison between the time vector associated with the geographic location and a visit likelihood distribution across time. The processor sorts at least some of the destinations returned by the local search in decreasing order of visit likelihood to select the most likely visited destination for that geographic location.

In a still further aspect, a system is provided for sorting, in order of decreasing visit likelihood, possible destinations visited by a user based on a geographic location from a user's location history. The system includes a computer processor and a memory connected to the processor and storing instructions to cause the processor to perform a plurality of functions. The instructions cause the processor to conduct a local search for destinations proximate to that geographic location, where the geographic location has a time associated with it and the search provides at least a name for the destination and a distance from the geographic location. The instructions also cause the processor to compute for each destination returned by the local search a visit likelihood, where the visit likelihood is computed as a function of at least the distance between the destination and the geographic location and a comparison between the time associated with the geographic location and a visit likelihood distribution across time. The instructions further cause the processor to sort at least some of the destinations returned by the local search in decreasing order of visit likelihood to select the most likely visited destination for that geographic location.

In examples of the aspects described above, the geographic location can represent a cluster of proximate geographic location data points representing a visit having a visit location, a visit start time, and a visit end time. The geographic location can also represent a plurality of visits, with each visit having a visit start time, and a visit end time and wherein the computing of a visit likelihood for a particular visit includes comparing each visit start time and visit end time.

In other examples, a sorted list of the destinations can be presented to the user for selection of the destination visited.

In further examples, the local search can return a prominence score for each destination, the computing of a visit likelihood further being computed as a function of the prominence score. The local search may also return business hours data so that the computing of a visit likelihood can further be computed as a function of whether the destination was open or closed at the time associated with the geographic location. Where the geographic data includes a plurality of visit times, the visit likelihood can further be computed as a function of whether the destination was open or closed at each visit time.

In other examples, the destinations can be associated with at least one selected from within a plurality of destination categories, with each destination category having a visit likelihood distribution across time that is applied to destinations that are associated with that destination category. The visit likelihood distributions across time may also indicate a visit likelihood based on time of day. The visit likelihood distributions across time may also indicate a visit likelihood based on day of the week.

In another aspect, a technique for automatically providing a user with information relating to a place the user is likely to visit is provided. The technique includes receiving a location history of the user and storing the location history in a memory. The technique also includes, using a processor coupled to the memory, extracting from the location history a place that the user previously visited and visit history data indicating whether the user visited the place during any of a plurality of past instances of a timeslot. The technique also includes, using the processor, determining whether the user is likely to visit the place during a future instance of the timeslot based on the visit history data, and if it is determined that the user is likely to visit the place during the future instance of the timeslot, using the processor, outputting information relating to the place before the future instance of the timeslot commences.

The timeslot can correspond to a particular day of the week and a particular time of the day. The technique can include determining whether the user is likely to visit the place during future instances of each of a plurality of timeslots, said future instances corresponding to hour-long timeslots immediately following a current time of the user. The timeslot can correspond only to a particular time of the day. The timeslot can correspond to a particular weekday and a particular time of the weekday. The timeslot can correspond to the two weekend days in a one week period. The timeslot can correspond to the four weekend days in a two week period.

The technique can include storing in the memory a visit vector comprising a plurality of elements, each element corresponding to a past instance of the timeslot and either having a value indicating that the user visited the place during the past instance of the timeslot or a value indicating that the user did not visit the place during the past instance of the timeslot. The visit vector can include a stream of Boolean values. The technique can include selecting the Y most-recent elements in the visit vector as a sub-stream of interest, and counting the number of positive elements X in the sub-stream of interest.

The technique can include executing a function $T(X,Y)$ that receives as inputs the visit vector, the value of Y, and the value of X, and that returns the number of sub-streams in the visit vector having a length of Y, having exactly X positive elements, and being followed by a subsequent element. The technique can include, if the number returned by the function $T(X,Y)$ is less than a predetermined occurrence threshold, iteratively decrementing Y by one and repeating said selecting, counting, and executing until Y is equal to zero or a value of Y is obtained for which the function $T(X,Y)$ returns a number greater than or equal to the predetermined occurrence threshold. The technique can include calculating a future visit probability as the number of sub-streams of type $(X,Y)$ in the visit vector which are followed by a positive element, divided by the number returned by the function $T(X,Y)$. It can be determined that the user is likely to visit the place during the future instance of the timeslot when the future visit probability exceeds a predetermined probability threshold.

The technique can include using the processor to determine whether the user is likely to visit the place during the future instance of the timeslot based on at least one of the user's past visits to other places of the same type as the place, visits to the place by other users having a demographic in common with the user, all other users' visits to the place, all other users' visits to other places of the same type as the place, and visits to other places of the same type as the place by other users having a demographic in common with the user. The technique can include using a Markov chain model to determine whether the user is likely to visit the place during a future instance of the timeslot based on the visit history data. The technique can include using a beta-prior model to determine whether the user is likely to visit the place during a future instance of the timeslot based on the visit history data. The technique can include using a random forest model to determine whether the user is likely to visit the place during a future instance of the timeslot based on the visit history data. The random forest model can be executed using a machine learning system. The technique can include providing as an input to the machine learning system a visit vector comprising a plurality of elements, each element corresponding to a past visit to the place and having a value indicating the number of days elapsed since that past visit. The technique can include providing as an input to the machine learning system a visit vector comprising a plurality of elements, each element corresponding to a past visit to the place and having a value indicating the number of days elapsed since an immediately-preceding past visit to the place.

The technique can include at least one of sending a text message including the information to a mobile device of the user, sending a push notification including the information to the mobile device of the user, sending an email including the information to a mobile device of the user, sending a data transmission including the information to the mobile device of the user, sending an instruction to display the information on a display screen to the mobile device of the user, and sending an instruction to navigate a web browser to a website including the information to the mobile device of the user. The information can include at least one of a weather forecast associated with the place, a traffic update associated with the place, a news story associated with the place, directions to the place, and contact info of user contacts that live or work near the place.

In another aspect, a system for automatically providing a user with information relating to a place the user is likely to visit is provided. The system includes a processor and a memory having instructions stored thereon for execution by the processor. The instructions include a location history module that receives a location history of the user and stores the location history in a memory. The instructions also include a visit prediction module that extracts from the location history a place that the user previously visited and visit history data indicating whether the user visited the place during any of a plurality of past instances of a timeslot, and determines whether the user is likely to visit the place during a future instance of the timeslot based on the visit history data. The instructions also include an output module that, if it is determined that the user is likely to visit the place during the future instance of the timeslot, outputs information relating to the place before the future instance of the timeslot commences.

In another aspect, a mobile device for automatically providing a user with information relating to a place the user is likely to visit is provided. The mobile device includes a processor and a memory having instructions stored thereon for execution by the processor. The instructions include a location history module that receives a location history of the user and stores the location history in a memory. The instructions also include a visit prediction module that extracts from the location history a place that the user previously visited and visit history data indicating whether the user visited the place during any of a plurality of past instances of a timeslot, and determines whether the user is likely to visit the place during a future instance of the timeslot based on the visit history data. The instructions also include an output module that, if it is determined that the user is likely to visit the place during the future instance of the timeslot, outputs information relating to the place before the future instance of the timeslot commences.

In some examples, the disclosure describes techniques that can be implemented by one or more devices described with reference to FIG. 1, e.g., mobile device 120 and/or location server 150. As described above, in some examples, functionality of location server 150 can be implemented by mobile device 120. Mobile device 120 and location server 150 can be generically referred to as a computing device.

In one examples, a technique includes determining, by a computing system (e.g., location server 150 and/or mobile device 120), information associated with a plurality of destinations proximate to a geographic location from a location history associated with a user, the geographic location being associated with a time, the information associated with the plurality of destinations including, for each respective destination of the plurality of destinations, at least a name of the respective destination and a respective distance between the respective destination and the geographic location. The technique can also include, for each respective destination of the plurality of destinations, determining, by the computing system (e.g., location server 150 and/or mobile device 120), based at least in part on 1) the respective distance between the respective destination and the geographic location and 2) a comparison between the time associated with the geographic location and a visit likelihood distribution across time, a visit likelihood associated with the respective destination. Additionally, the technique can include sorting, by the computing system (e.g., location server 150 and/or mobile device 120) and based at least in part on the visit likelihood associated with the respective destination, a portion of the plurality of destinations, and outputting, by the computing system (e.g., location server 150 and/or mobile device 120), an indication of the portion of the plurality of destinations.

In some examples, outputting, by the computing system (e.g., location server 150 and/or mobile device 120), the indication of the portion of the plurality of destinations includes outputting, by the computing system, to a mobile computing device, the indication of the portion of the plurality of destinations, such that the indication is output for display by the mobile computing device.

In some examples, the geographic location represents a cluster of proximate geographic location data points representing a visit to the geographic location, the visit having a visit start time and a visit end time.

In some examples, the geographic location represents a plurality of visits to the geographic location, each respective visit of the plurality of visits having a respective visit start time and a respective visit end time, and determining the visit likelihood for the respective destination includes comparing each respective visit start time and respective visit end time to the visit likelihood distribution across time.

In some examples, the information associated with the plurality of destinations proximate to the geographic location comprises a respective prominence score for each respective destination of the plurality of destinations, and determining the visit likelihood for the respective destination comprises determining the visit likelihood for the respective destination based at least in part on the respective distance between the respective destination and the geographic location, the comparison between the respective time associated with the geographic location and the visit likelihood distribution across time, and the respective prominence score.

In some examples, the information associated with the plurality of destinations proximate to the geographic location comprises business hours data for each respective destination of the plurality of destinations, and determining the visit likelihood for the respective destination comprises determining the visit likelihood for the respective destination based at least in part on the respective distance between the respective destination and the geographic location, the comparison between the time associated with the geographic location and the visit likelihood distribution across time, and whether the destination was open or closed at the time associated with the geographic location.

In some examples, respective destinations of the plurality of destinations are associated with at least one destination category selected from a plurality of destination categories, each respective destination category having a visit likelihood distribution across time that is applied to respective destinations that are associated with the respective destination category.

In some examples, the visit likelihood distribution across time indicates a visit likelihood based on time of day.

In another example, the disclosure describes a computer-readable storage device storing instructions that, when executed, cause at least one processor of a computing device (e.g., location server 150 and/or mobile device 120) to: determine, based at least in part on a plurality of proximate geographical location data points from a location history associated with a user, a geographic location for a visit having a visit start time and a visit end time. The instructions can also, when executed, cause the at least one processor to determine information associated with a plurality of destinations proximate to the geographic location, the information associated with the plurality of destinations including, for each respective destination of the plurality of destinations, at least a name of the destination and a respective distance between the respective destination and the geographic location. Additionally, the instructions can, when executed, cause the at least one processor to, for each respective destination of the plurality of destinations, determine, based at least in part on 1) the respective distance between the respective destination and the geographic location, 2) a comparison between the visit start time and a visit likelihood distribution across time, and 3) a comparison between the visit end time and the visit likelihood distribution across time, a respective visit likelihood for the respective destination. Further, the instructions can, when executed, cause the at least one processor to sort, based at least in part on the respective visit likelihood associated with the respective destination, a portion of the plurality of destinations, and output an indication of the portion of the plurality of destinations.

In some examples, the instructions, when executed, that cause at least one processor of the computing device to output the indication of the portion of the plurality of destinations comprise instructions that, when executed, cause the at least one processor of the computing device to output, to a mobile computing device, the indication of the portion of the plurality of destinations, such that the indication is output for display by the mobile computing device.

In some examples, the geographic location represents a plurality of visits to the geographic location, with each respective visit of the plurality of visits having a respective visit start time and a respective visit end time, and the instructions, when executed, cause the at least one processor of the computing device to determine the visit likelihood for the respective destination of the plurality of destinations by comparing each respective visit start time and respective visit end time to the visit likelihood distribution across time.

In some examples, the information associated with the plurality of destinations proximate to the geographic location comprises a respective prominence score for each respective destination of the plurality of destinations, and the instructions, when executed, cause the at least one processor of the computing device to determine the visit likelihood for the respective destination based at least in part on the respective distance between the respective destination and the geographic location, the comparison between the visit start time and the visit likelihood distribution across time, the comparison between the visit end time and the visit likelihood distribution across time, and the respective prominence score.

In some examples the information associated with the plurality of destinations proximate to the geographic location comprises business hours data for each respective destination of the plurality of destinations, and the instructions, when executed, cause the at least one processor of the computing device to determine the visit likelihood for the respective destination based at least in part on the respective distance between the respective destination and the geographic location, the comparison between the visit start time and the visit likelihood distribution across time, the comparison between the visit end time and the visit likelihood distribution across time, and whether the destination was open or closed at the time associated with the geographic location.

In some examples, respective destinations of the plurality of destinations are associated with at least one destination category selected from a plurality of destination categories, each respective destination category having a visit likelihood distribution across time that is applied to respective destinations that are associated with the respective destination category.

In some examples, the visit likelihood distribution across time indicates a visit likelihood based on time of day.

In another example, the disclosure describes a technique that includes receiving, by a computing device (e.g., mobile device 120 and/or location server 150), a location history associated with a user. The technique further includes determining, by the computing device (e.g., mobile device 120 and/or location server 150), based at least in part on the location history, a place that the user previously visited and visit history data indicating whether the user visited the place during any of a plurality of past instances of a timeslot. Additionally, the technique can include determining, by the computing device (e.g., mobile device 120 and/or location server 150) and based at least in part on the visit history data, that the user is likely to visit the place during a future instance of the timeslot. The technique also can include, responsive to determining that the user is likely to visit the place during the future instance of the timeslot, outputting, by the computing device (e.g., mobile device 120 and/or location server 150), information relating to the place prior to the beginning of the future instance of the timeslot.

In some examples, determining that the user is likely to visit the place during the future instance of the timeslot comprises determining that the user is likely to visit the place during each respective timeslot of a plurality of future instances of the timeslot.

In some examples, determining the place that the user previously visited and visit history data indicating whether the user visited the place during any of the plurality of past instances of the timeslot comprises determining a visit vector comprising a plurality of vector elements, each respective vector element corresponding to a respective past instance of the timeslot and having a value indicating that the user visited the place during the respective past instance of the timeslot or a value indicating that the user did not visit the place during the respective past instance of the timeslot.

In some examples, determining the place that the user previously visited and visit history data indicating whether the user visited the place during any of the plurality of past instances of the timeslot comprises: executing a function $T(X,Y)$ that receives as inputs the visit vector, a value of Y, and a value of X, wherein Y is a length of a sub-stream of interest measured in the number of elements in the sub-stream, wherein X is the number of positive elements in the sub-stream of interest, and wherein the function $T(X,Y)$ returns the number of sub-streams in the visit vector having the length of Y, having exactly X positive elements, and being followed by a subsequent element in the visit vector.

In some examples, determining the place that the user previously visited and visit history data indicating whether the user visited the place during any of the plurality of past instances of the timeslot comprises: in instances in which the number returned by the function $T(X,Y)$ is less than a predetermined threshold, decrementing Y by one; and executing the function $T(X,Y)$ for the value of Y and the value of X.

In some examples, determining the place that the user previously visited and visit history data indicating whether the user visited the place during any of the plurality of past instances of the timeslot comprises: calculating a future visit probability as the number of sub-streams of type $(X,Y)$ in the visit vector which are followed by a positive element, divided by the number returned by the function $T(X,Y)$.

In some examples, determining that the user is likely to visit the place during the future instance of the timeslot comprises determining that the user is likely to visit the place during the future instance of the timeslot when a future visit probability exceeds a predetermined probability threshold value.

In some examples, determining that the user is likely to visit the place during the future instance of the timeslot comprises using at least one of a Markov chain model, a beta-prior model, and a random forest model to determine whether the user is likely to visit the place during the future instance of the timeslot.

In an additional example, the disclosure describes a computer-readable storage device storing instructions that, when executed, cause at least one processor of a computing device (e.g., mobile device 120 and/or location server 150) to receive a location history associated with a user. The instructions, when executed, also cause the at least one processor to determine, based at least in part on the location history, a visit vector comprising a plurality of vector elements, each respective vector element corresponding to a respective past instance of a timeslot and having a value indicating that the user visited a place during the respective past instance of the timeslot or a value indicating that the user did not visit the place during the respective past instance of the timeslot. The instructions, when executed, further cause the at least one processor to execute a function $T(X,Y)$ that receives as inputs the visit vector, a value of Y, and a value of X, wherein Y is a length of a sub-stream of interest measured in the number of elements in the sub-stream, wherein X is the number of positive elements in the sub-stream of interest, and wherein the function $T(X,Y)$ returns the number of sub-streams in the visit vector having the length of Y, having exactly X positive elements, and being followed by a subsequent element in the visit vector. Additionally, the instructions, when executed, also cause the at least one processor to determine, based at least in part on the number returned by the function $T(X,Y)$, that the user is likely to visit the place during a future instance of the timeslot; and, responsive to determining that the user is likely to visit the place during the future instance of the timeslot, output information relating to the place prior to the beginning of the future instance of the timeslot.

In some examples, the instructions, when executed, cause the at least one processor of the computing device to: in instances in which the number returned by the function $T(X,Y)$ is less than a predetermined threshold, decrement Y by one; and execute the function $T(X,Y)$ for the value of Y and the value of X.

In some examples, the instructions, when executed, cause the at least one processor of the computing device to: calculate a future visit probability as the number of sub-streams of type $(X,Y)$ in the visit vector which are followed by a positive element, divided by the number returned by the function $T(X,Y)$.

In some examples, the instructions, when executed, cause the at least one processor of the computing device to determine that the user is likely to visit the place during the future instance of the timeslot when a future visit probability exceeds a predetermined probability threshold value.

In some examples, the timeslot corresponds to a particular day of the week and a particular time of the day.

In some examples, the timeslot corresponds only to a particular time of the day.

In some examples, the timeslot corresponds to the two weekend days in a one week period.

Although a few examples have been described in detail above, other modifications are possible. Moreover, other mechanisms for performing the systems and techniques described herein may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
   determining, by a computing system, information associated with a plurality of destinations proximate to a geographic location from a location history associated with a user, the geographic location being associated with a time, the information associated with the plurality of destinations including, for each respective destination of the plurality of destinations, at least a name of the respective destination, a respective distance between the respective destination and the geographic location, and business hours data for the respective destination;
   for each respective destination of the plurality of destinations, determining, by the computing system, based at least in part on 1) the respective distance between the respective destination and the geographic location, 2) a comparison between the time associated with the geographic location and a visit likelihood distribution across time, a visit likelihood associated with the respective destination, and 3) whether the destination was open or closed at the time associated with the geographic location;
   sorting, by the computing system and based at least in part on the visit likelihood associated with the respective destination, a portion of the plurality of destinations; and
   outputting, by the computing system, an indication of the portion of the plurality of destinations.

2. The method of claim 1, wherein outputting, by the computing system, the indication of the portion of the plurality of destinations comprises outputting, by the computing system, to a mobile computing device, the indication of the portion of the plurality of destinations, such that the indication is output for display by the mobile computing device.

3. The method of claim 1, wherein the geographic location represents a cluster of proximate geographic location data points representing a visit to the geographic location, the visit having a visit start time and a visit end time.

4. The method of claim 3,
   wherein the geographic location represents a plurality of visits to the geographic location, each respective visit of the plurality of visits having a respective visit start time and a respective visit end time, and
   wherein determining the visit likelihood for the respective destination includes comparing each respective visit start time and respective visit end time to the visit likelihood distribution across time.

5. The method of claim 1,
   wherein the information associated with the plurality of destinations proximate to the geographic location comprises a respective prominence score for each respective destination of the plurality of destinations, and
   wherein determining the visit likelihood for the respective destination comprises determining the visit likelihood for the respective destination based at least in part on the respective distance between the respective destination and the geographic location, the comparison between the respective time associated with the geographic location and the visit likelihood distribution across time, and the respective prominence score.

6. The method of claim 1, wherein respective destinations of the plurality of destinations are associated with at least one destination category selected from a plurality of destination categories, each respective destination category having a visit likelihood distribution across time that is applied to respective destinations that are associated with the respective destination category.

7. The method of claim 6, wherein the visit likelihood distribution across time indicates a visit likelihood based on time of day.

8. A non-transitory computer-readable storage device storing instructions that, when executed, cause at least one processor of a computing device to:
   determine, based at least in part on a plurality of proximate geographical location data points from a location history associated with a user, a geographic location for a visit having a visit start time, a visit end time, and business hours data;
   determine information associated with a plurality of destinations proximate to the geographic location, the information associated with the plurality of destinations including, for each respective destination of the plurality of destinations, at least a name of the destination and a respective distance between the respective destination and the geographic location;
   for each respective destination of the plurality of destinations, determine, based at least in part on 1) the respective distance between the respective destination and the geographic location, 2) a comparison between the visit start time and a visit likelihood distribution across time, 3) a comparison between the visit end time and the visit likelihood distribution across time, and 4) whether the destination was open or closed at the time associated with the geographic location, a respective visit likelihood for the respective destination;
   sort, based at least in part on the respective visit likelihood associated with the respective destination, a portion of the plurality of destinations; and
   output an indication of the portion of the plurality of destinations.

9. The non-transitory computer-readable storage device of claim 8, wherein the instructions that, when executed, cause at least one processor of a computing device to output the indication of the portion of the plurality of destinations comprise instructions that, when executed, cause the at least one processor of the computing device to output, to a mobile computing device, the indication of the portion of the plurality of destinations, such that the indication is output for display by the mobile computing device.

10. The non-transitory computer-readable storage device of claim 8, wherein the geographic location represents a plurality of visits to the geographic location, with each respective visit of the plurality of visits having a respective visit start time and a respective visit end time, further storing instructions that, when executed, cause the at least one processor of the computing device to determine the visit likelihood for the respective destination of the plurality of destinations by comparing each respective visit start time and respective visit end time to the visit likelihood distribution across time.

11. The non-transitory computer-readable storage device of claim 8, wherein the information associated with the plurality of destinations proximate to the geographic location comprises a respective prominence score for each respective destination of the plurality of destinations, further storing instructions that, when executed, cause the at least one processor of the computing device to determine the visit likelihood for the respective destination based at least in part on the respective distance between the respective destination and the geographic location, the comparison between the visit start time and the visit likelihood distribution across time, the comparison between the visit end time and the visit likelihood distribution across time, and the respective prominence score.

12. The non-transitory computer-readable storage device of claim 8, wherein respective destinations of the plurality of destinations are associated with at least one destination category selected from a plurality of destination categories, each respective destination category having a visit likelihood distribution across time that is applied to respective destinations that are associated with the respective destination category.

13. The non-transitory computer-readable storage device of claim 8, wherein the visit likelihood distribution across time indicates a visit likelihood based on time of day.

* * * * *